(12) United States Patent  
King et al.

(10) Patent No.: US 12,179,604 B2
(45) Date of Patent: *Dec. 31, 2024

(54) SHORT BLOCK LINEAR SYNCHRONOUS MOTORS AND SWITCHING MECHANISMS

(71) Applicant: Rockwell Automation, Inc., Milwaukee, WI (US)

(72) Inventors: Nathanael N. King, Ayer, MA (US); Brian M. Perreault, Stow, MA (US); Tracy M. Clark, Devens, MA (US); Richard D. Thornton, Concord, MA (US); Jason Young, Devens, MA (US); Michael W. Bottasso, Maynard, MA (US); Jesse Mendenhall, Brookline, NH (US)

(73) Assignee: Rockwell Automation, Inc., Milwaukee, WI (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/731,763

(22) Filed: Apr. 28, 2022

(65) Prior Publication Data

US 2022/0250483 A1 Aug. 11, 2022

Related U.S. Application Data

(63) Continuation of application No. 16/881,122, filed on May 22, 2020, now Pat. No. 11,332,020, which is a
(Continued)

(51) Int. Cl.
*B60L 13/10* (2006.01)
*B60L 13/00* (2006.01)
(Continued)

(52) U.S. Cl.
CPC ............ *B60L 13/10* (2013.01); *B60L 13/003* (2013.01); *B60L 13/03* (2013.01); *B60L 15/005* (2013.01);
(Continued)

(58) Field of Classification Search
CPC ........ B60L 13/00; B60L 13/10; B60L 13/003; B60L 13/03; B60L 13/04; B60L 15/005;
(Continued)

(56) References Cited

U.S. PATENT DOCUMENTS 8,616,134 B2* 12/2013 King ............... B65G 35/06
104/284
8,967,051 B2* 3/2015 King ............... B60L 13/10
104/284
(Continued)

FOREIGN PATENT DOCUMENTS

JP 9-028073 1/1997
JP 2012-516130 A 7/2012
WO 2010/085670 A1 7/2010

*Primary Examiner* — Robert J McCarry, Jr.
(74) *Attorney, Agent, or Firm* — Fletcher Yoder, P.C.

(57) ABSTRACT

The invention provides in some aspects a transport system comprising a guideway with a plurality of propulsion coils disposed along a region in which one or more vehicles are to be propelled. One or more vehicles are disposed on the guideway, each including a magnetic flux source. The guideway has one or more running surfaces that support the vehicles and along which they roll or slide. Each vehicle can have a septum portion of narrowed cross-section that is coupled to one or more body portions of the vehicle. The guideway includes a diverge region that has a flipper and an extension of the running surface at a vertex of the diverge. The flipper initiates switching of vehicle direction at a diverge by exerting a laterally directed force thereon. The extension continues switching of vehicle direction at the diverge by contacting the septum. Still other aspects of the invention provide a transport system, e.g., as described above, that includes a merge region with a flipper and a broadened region of the running surface. The flipper applies a lateral force to the vehicle to alter an angle thereof as the vehicle enters the merge region, and the broadened region
(Continued)

Straight guideway showing vehicles moving in close proximity.

continues the merge by contacting the septum of the vehicle, thereby, providing further guidance or channeling for the merge. The flipper, which can be equipped for full or partial deployment, is partially deployed in order to effect alteration of the vehicle angle as the vehicle enters the merge.

20 Claims, 26 Drawing Sheets

Related U.S. Application Data continuation of application No. 15/711,623, filed on Sep. 21, 2017, now Pat. No. 10,703,214, which is a continuation of application No. 14/688,737, filed on Apr. 16, 2015, now Pat. No. 9,771,000, which is a continuation of application No. 13/623,124, filed on Sep. 20, 2012, now Pat. No. 9,032,880, which is a continuation-in-part of application No. 12/692,441, filed on Jan. 22, 2010, now Pat. No. 8,967,051, which is a continuation-in-part of application No. 12/359,022, filed on Jan. 23, 2009, now Pat. No. 8,616,134.

(51) Int. Cl.
*B60L 13/03* (2006.01)
*B60L 15/00* (2006.01)
*E01B 25/34* (2006.01)

(52) U.S. Cl.
CPC ........... *E01B 25/34* (2013.01); *B60L 2200/26* (2013.01); *Y02T 10/64* (2013.01)

(58) Field of Classification Search
CPC ....... B60L 2200/26; B60M 1/00; B60M 1/14; E01B 25/34; Y02T 10/64
See application file for complete search history.

(56) References Cited

U.S. PATENT DOCUMENTS 9,032,880 B2    5/2015    King et al.
9,771,000 B2    9/2017    King et al.

* cited by examiner

Figure 1. Straight guideway showing vehicles moving in close proximity.

Figure 2. Vehicle for holding objects to be moved.

Figure 3. Vehicle showing switch guidance mechanisms and magnet array.

Figure 4. Cutaway view of vehicle showing magnets in a Halbach Array

Figure 5. Vehicle with only a single magnet in the magnet array.

Figure 6. Cutaway housing showing coils mounted close to guideway surface.

Figure 7. Typical waveform of current in a coil as a vehicle moves by.

Figure 8. Vehicles negotiating a 90° turn.

Figure 9. Vehicles negotiating a 180 vertical turn.

Figure 10. Right diverge showing flippers for controlling direction.

Figure 11. Turntable for turning, merging and diverging.

Figure 12. Cutaway view of right diverge showing coils for continuous propulsion Figure 13. Vertical transition with convex and concave transition pieces Figure 14. Example of layout showing use of guideway modules.

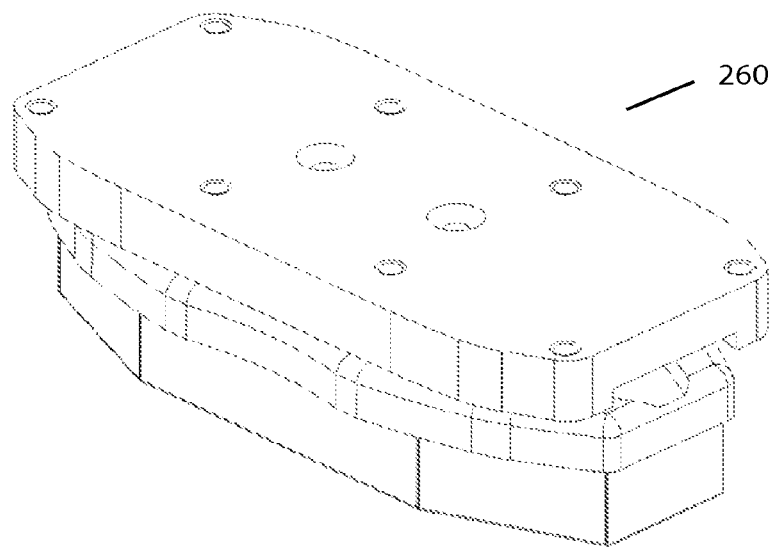
Figure 26A
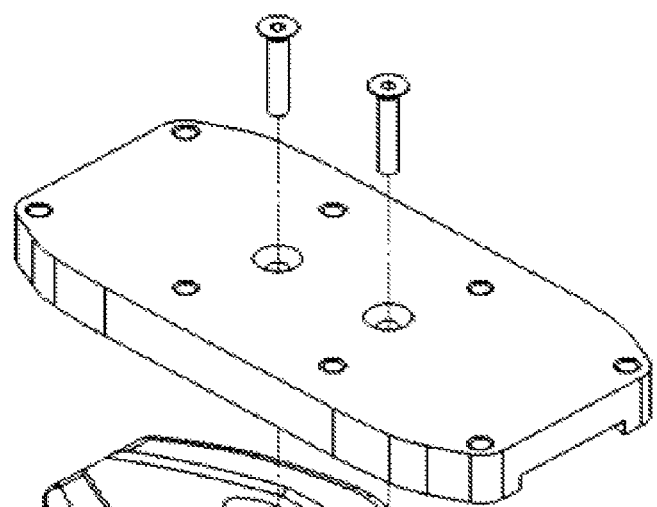
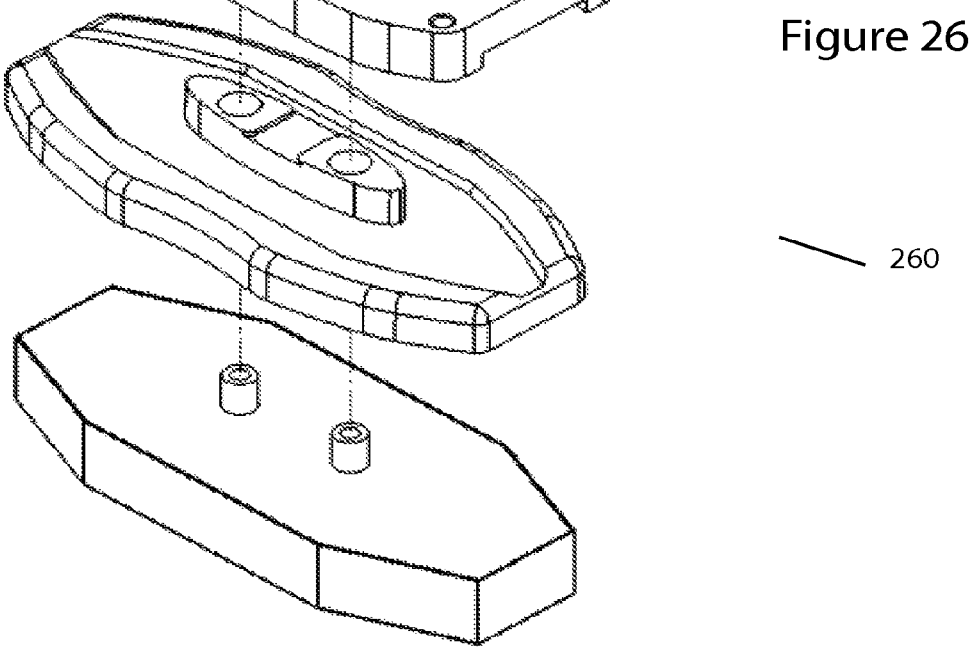
Figure 26B

SHORT BLOCK LINEAR SYNCHRONOUS MOTORS AND SWITCHING MECHANISMS

CROSS-REFERENCE TO RELATED APPLICATIONS

The present application is a continuation of and claims the benefit of U.S. patent application Ser. No. 16/881,122, filed May 22, 2020, entitled "Short Block Linear Synchronous Motors and Switching Mechanisms," which is a continuation of Ser. No. 15/711,623, filed Sep. 21, 2017, entitled "Short Block Linear Synchronous Motors and Switching Mechanisms," now U.S. Pat. No. 10,703,214, which is a continuation of Ser. No. 14/688,737, filed Apr. 16, 2015, entitled "Short Block Linear Synchronous Motors and Switching Mechanisms," now U.S. Pat. No. 9,771,000, which is a continuation of Ser. No. 13/623,124, filed Sep. 20, 2012, entitled "Transport System Powered by Short Block Linear Synchronous Motors and Switching Mechanism," now U.S. Pat. No. 9,032,880, which is a continuation-in-part of, and claims the benefit of, U.S. patent application Ser. No. 12/692,441, filed Jan. 22, 2010, entitled "Transport System Powered by Short Block Linear Synchronous Motors and Switching Mechanism," now U.S. Pat. No. 8,967,051, which is a continuation-in-part of, and claims the benefit of U.S. patent application Ser. No. 12/359,022, filed Jan. 23, 2009, entitled "Transport System Powered by Short Block Linear Synchronous Motors," now U.S. Pat. No. 8,616,134, and also claims the benefit of a U.S. Provisional Patent Application bearing Ser. No. 61/184,570, filed Jun. 5, 2009, entitled "Improved Transport System Powered by Short Block Linear Synchronous Motors." The teachings of the foregoing applications are hereby incorporated herein by reference.

BACKGROUND OF THE INVENTION

The invention pertains to transport systems and more particularly, by way of example, to guideway-based transport system with short block linear synchronous motors. The invention has application, by way of non-limiting example, in production lines, laboratories and other applications requiring complex guideways, sharp turns, merge and diverge switching, and/or inverted operation.

There are many types of transport systems that can move objects on a guideway. Examples include: wheel-suspended vehicles propelled by rotary or linear motors, maglev or air-cushion suspended vehicles propelled by linear motors or cables, vehicles that move in tubes propelled by air pressure, vehicles supported or guided by bearings, and vehicles that are moved on conveyor belts. Existing transport systems have many useful applications but there are opportunities for substantial improvement, for example, in the precise movement of relatively small and closely spaced objects on a complex guideway.

Small and medium size objects are often transported on conveyor belts because this eliminates the need for wheels or other mechanisms to suspend, guide and propel the objects. Belt transport systems are relatively inexpensive but they lack precise control that is often needed and they require substantial maintenance because of many moving parts. Other approaches to low cost transport include air propelled vehicle moving in tubes and the use of gravitational forces to move objects down an incline, but these approaches have even less precise control.

The advantages of using linear synchronous motor (LSM) propulsion are well known and described in other patents (by way of non-limiting example, U.S. Pat. Nos. 7,458,454, 7,448,327, 6,983,701, 6,917,136, 6,781,524, 6,578,495, 6,499,701, 6,101,952, and 6,011,508, all assigned to the assignee hereof and the teachings of all of which are incorporated herein by reference), but in many cases, particularly, for example, when moving small and closely spaced objects, the LSM can be more expensive and provide less throughput than competing propulsive systems.

In view of the foregoing, an object of the invention is to provide improved transport systems, apparatus and methods.

A related object of the invention is to provide such systems, apparatus and methods as take advantage of LSM technologies.

Another related object of the invention is to provide such systems, apparatus and methods as are adapted for transport of small objects and/or medium-sized objects.

A further related object of the invention is to provide such systems, apparatus and methods as are adapted for use with closely-spaced objects.

Still another object of the invention is to provide such systems, apparatus and methods as are adapted for use in production lines, laboratories and other applications requiring complex guideways, sharp turns, merge and diverge switching, and/or inverted operation.

SUMMARY OF THE INVENTION

The foregoing are among the objects attained by the invention, which provides in some aspects a transport system comprising a guideway with a plurality of propulsion coils disposed along a region in which one or more vehicles are to be propelled. One or more vehicles are disposed on the guideway, each including a magnetic flux source. The guideway has one or more running surfaces that support the vehicles and along which they roll or slide. Each vehicle can have a septum portion of narrowed cross-section that is coupled to one or more body portions of the vehicle. The guideway includes a diverge region that has a flipper and an extension of the running surface at a vertex of the diverge. The flipper initiates switching of vehicle direction at a diverge by exerting a laterally directed force thereon. The extension continues switching of vehicle direction at the diverge by contacting the septum.

Further aspects of the invention provide a transport system, e.g., as described above, in which the flipper initiates switching of vehicle direction by contacting a vehicle, e.g., along one of the outer surfaces of its body (as opposed, for example, to contacting the septum of the vehicle).

Yet still further aspects of the invention provides a transport system, e.g., as described in claim 1, in which the running surface extension at the diverge is triangularly shaped.

Still another aspect of the invention provides a transport system, e.g., as described above, in which the guideway has one or more guidance surfaces that constrain motion the vehicles laterally. According to these and related aspects, those surfaces provide guidance for switching of vehicle direction at the diverge.

Thus, for example, in some aspects of the invention the flipper initiates switching of vehicle direction at a diverge by exerting a lateral force on the vehicle, the extension of the running surfaces a vertex of the diverge continues switching of the vehicle direction, and/or the guidance surface provides still further guidance for switching at a latter point of the diverge.

Related aspects of the invention provide a transport system, e.g., as described above, in which switch is mechanically actuated, e.g., by a rotary stepper motor that includes zero, one or more encoders. Other related aspects of the invention provide such a system in which an arm of the stepper motor is received in a kidney-shaped aperture of the flipper. Still yet other related aspects of the invention provide such a system in which the motor drives the flipper into any of three positions: undeployed, deployed and partially-deployed.

Still other aspects of the invention provide a transport system, e.g., as described above, arranged for small parts inspection and/or assembly, wherein the vehicles are between 50 mm and 200 mm wide, have lengths of between one and two times that width, and have loaded masses of between between 0.2 kg and 4 kg; the vehicles move on the guideway at speeds in excess of 2 m/s; and, the flipper initiates switching of a vehicle by moving less than about 2 cm.

Still yet other aspects of the invention provide a transport system, e.g., as described above, in which one or more of the vehicles has guidance surfaces that include one or more first regions for contacting the guidance surface of the guideway at some portions of the guideway and include one or more second regions for contacting the guidance surface of the guideway at other portions of the guideway. Those "first" regions can be straightaways, while the "second" regions can be curves. Moreover, according to related aspects of the invention, the flipper of a system, e.g., as described above, can initiate switching of vehicle direction at a diverge by contacting one or more of the second regions—which, according to further aspects of the invention may be curved.

Yet other aspects of the invention provide a transport system, e.g., as described above, in which one or more of the vehicles has one or more pins extending from near where the running surfaces that form part of the vehicle roll or slide along running surfaces of the guideway, and in which those pins interact with the flipper to control direction of motion of the vehicle at the diverge.

Still other aspects of the invention provide a transport system, e.g., as described above, that includes a merge region including a flipper and a broadened region of the running surface. The flipper applies a lateral force to the vehicle to alter an angle thereof as the vehicle enters the merge region, and the broadened region continues the merge by contacting the septum of the vehicle, thereby, providing further guidance or channeling for the merge.

Related aspects of the invention provide such a transport system in which the flipper is equipped for being fully- or partially-deployed, and in which the flipper is utilized in the partially-deployed configuration for effecting alteration of the vehicle angle as the vehicle enters the merge.

Still yet other aspects of the invention provide vehicles for use in transport systems, e.g., as described above. Such vehicles can generally be of rectangular, pointed-oval or other cross-section. Moreover, two or more of such vehicles can be coupled, e.g., pivotably, in order to form a further vehicle.

These and other aspects of the invention are evident in the text that follows and in the drawings.

Other aspects of the invention provide guideways, guideway modules, and vehicles for use thereon, constructed and/or operated as discussed above. Still other aspects of the invention provide methods of operating transport systems, guideways, guideway modules, and vehicles for use thereon paralleling the foregoing.

BRIEF DESCRIPTION OF DRAWINGS

A more complete understanding of the invention may be attained by reference to the drawings, in which:

FIGS. 25A-25B and 26A-26B depict further configurations of vehicles in accord with the invention.

DETAILED DESCRIPTION OF THE ILLUSTRATED EMBODIMENT

Introduction

Described here is an LSM-based transport system that allows vehicles to move on a guideway that can be complex and that can include sharp horizontal and vertical turns, merge and diverge switching, and inverted operation. Examples of applications include: moving bottles on an assembly line while they are being filled and capped, moving vials in a laboratory for analysis, moving electronic devices along a production line so that robots can insert components, and sorting objects that arrive from a multiplicity of sources and must be delivered to appropriate locations. In some cases it is feasible to use wheels, bearing or other rolling elements to assist in suspension and guidance, but this invention can also be used in cases where there are no wheels (or other rolling elements) and the vehicles slide on a guideway's running surface. Wheel-less vehicles can be small and inexpensive when the objects to be moved are not too large. For heavier vehicles the same short block design is suitable for wheel- or bearing-based suspension and guidance.

The result is a transport system that provides an economically viable means of using LSM propulsion to propel and control closely spaced small to medium size vehicles on a guideway.

Among other aspects of the systems described herein are LSM motor modules that also function as the transport system track (or "guideway") pieces. A selection of standard track building blocks fit together in a plug-and-play manner to form an almost endless variety of layout options. The motor modules (or "motors", for short) can contain not only the propulsion and intelligent routing elements, but also the guidance and structural support features to allow for rapid assembly and track configuration. The system is ideally suited, by way of non-limiting example, for environments requiring clean operation and/or wash down capability. It can also support "track and trace" requirements, as each vehicle can be uniquely identified and constantly tracked throughout the system.

A suspension system with a coefficient of friction obtainable with sliding motion can beneficially be used with an LSM with negligible attractive force. This is achieved, in the illustrated embodiment, by using a coreless motor with propulsion coils mounted, e.g., in close proximity to the vehicle magnets.

The text that follows describes components and operation of embodiments of the invention. It is understood that many variations on this design are possible and are contemplated by the invention, but this description shows how to achieve the foregoing and other objectives with a simple system that can be manufactured at a reasonable cost.

Guideway

Figure 1:
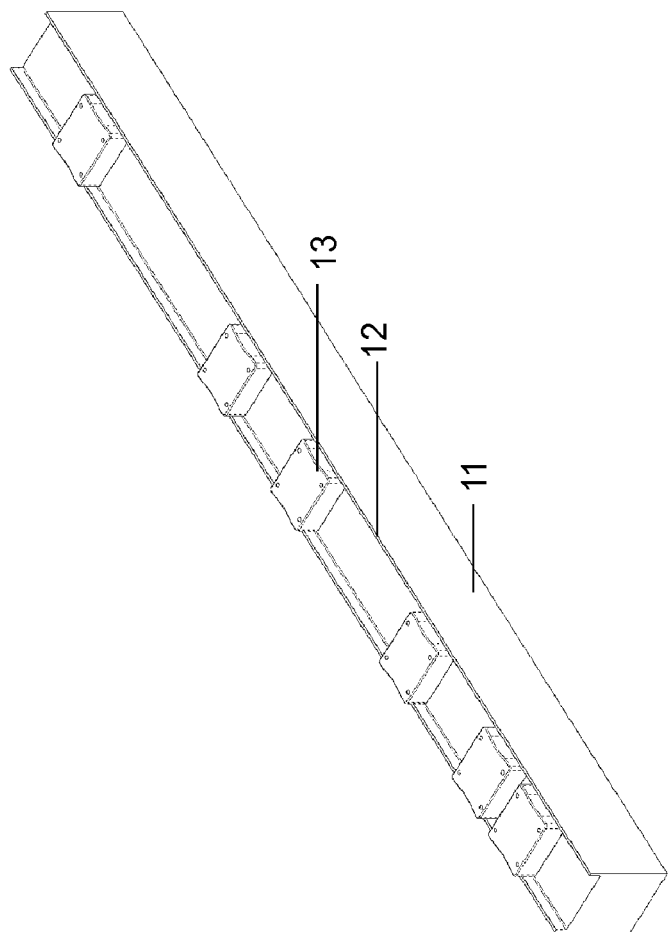
FIG. 1 depicts a system according to the invention, including a straight guideway and vehicles propelled thereon by an LSM in close proximity while sliding on a low friction guideway surface and guided by rails on the side of the guideway.

FIG. 1 shows a straight section of guideway with vehicles 13 moving in close proximity. The structure of the guideway can provide guidance in one or more dimensions by rails 12 on the side. For applications where the vehicle does not have wheels they slide on the guideway's running surface and special materials (discussed below) are used to minimize friction. The guideway housing 11 contains all of the electronics including position sensing means, propulsion coils, power electronic components, and microprocessors.

The design shown in these Figures is based on vehicles that are about 50 mm wide and 50 to 60 mm long. For larger objects the guideway and vehicle dimensions can be scaled, much as model railroads have been constructed with a variety of scaling factors.

Vehicle

Figure 2:
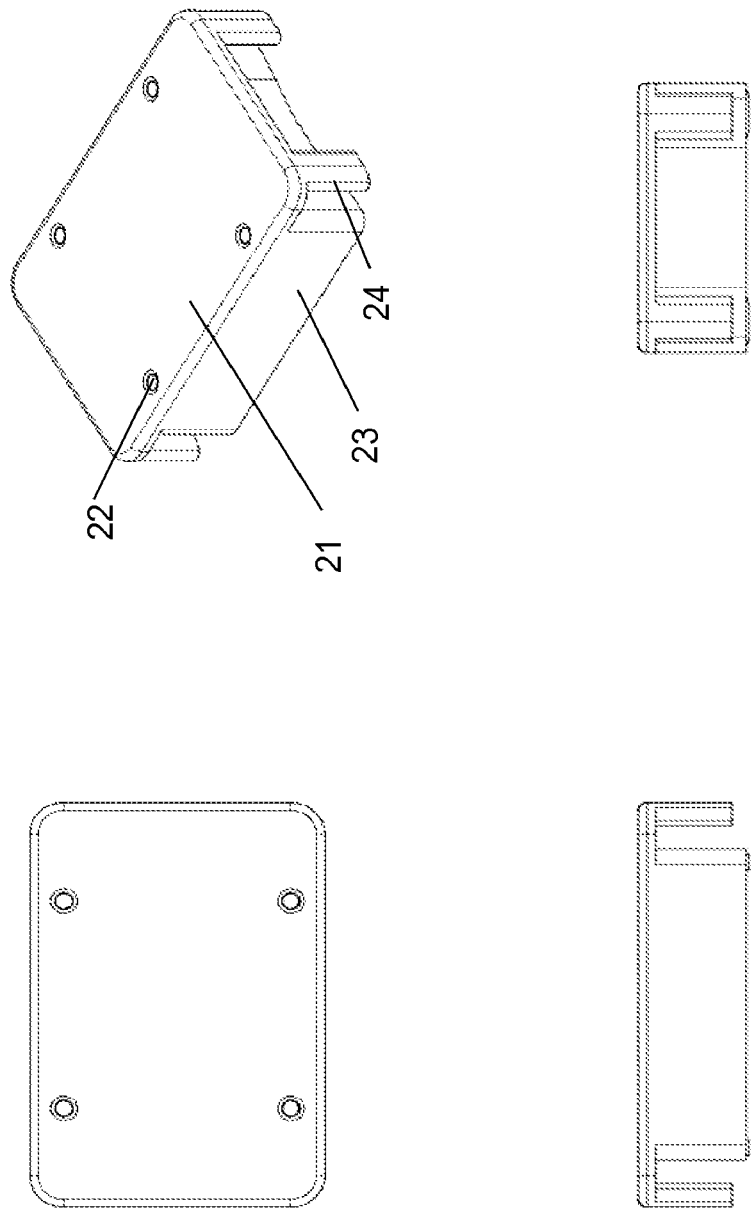
FIG. 2 shows details of a vehicle according to one practice of the invention used to hold objects for moving on the guideway in FIG. 1.
Figure 3:
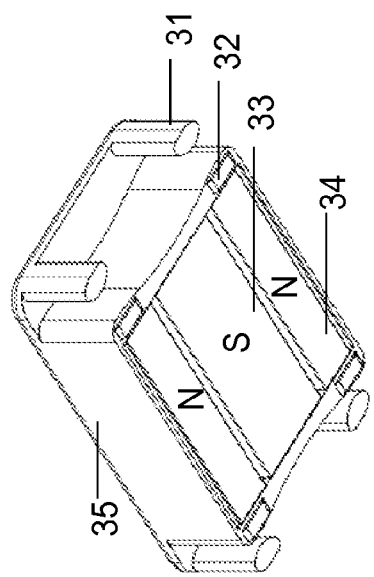
FIG. 3 shows vehicle guidance mechanisms and magnet array in a system according to one practice of the invention.

FIGS. 2 and 3 show a vehicle 21 that can be used as part of the proposed transport system. It is relatively small, about 50 mm square and 20 mm high, and has components 32 (here, disposed on the lower surface of vehicle 21) with running (or "sliding") surfaces that slide on the running (or "sliding") surface of the guideway. Holes 22 in the top of the vehicle are used to mount support mechanisms for the objects that are to be moved.

The vehicle has curved sides 23 that match the sides of a curved guideway so as to allow short radius horizontal turns. It is guided by the guideway and can move in a normal upright position when transporting an object as well as moving in an inverted position when not carrying an object. It can also negotiate vertical turns. Pins 24, 31 in the corners of the vehicle interact with mechanisms in the diverge and modules so as to control the direction of motion.

FIG. 3 is a view of the lower surface of the vehicle and shows the permanent magnets 33, 34 that are mounted near the bottom of the vehicle and provide the means for LSM propulsion.

Figure 4:
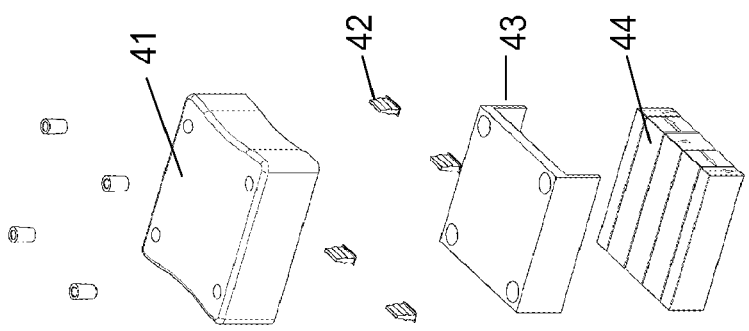
FIG. 4 is similar to FIG. 3 but with a Halbach Array for the magnets.
Figure 5:
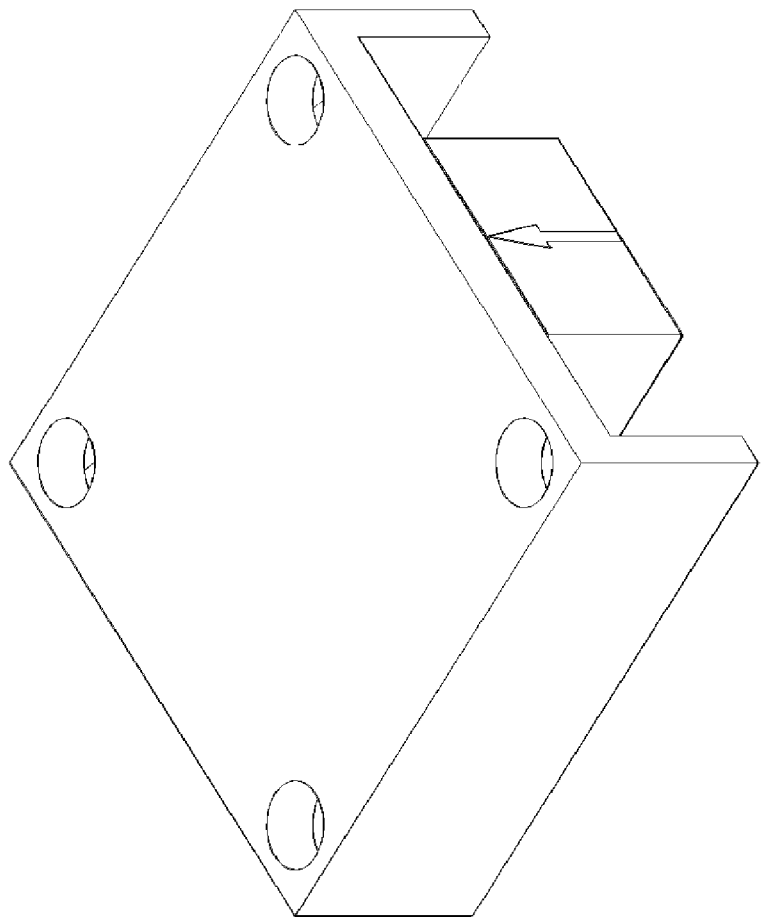
FIG. 5 is similar to FIG. 3 but with a single magnet used for propulsion.

FIG. 4 shows a variation of FIG. 3 in which a Halbach Array 44 is used for the magnet structure so as to create higher force for a given weight. FIG. 5 shows a single magnet structure 51 that is suitable for applications where less force is required.

Larger objects can be moved on this same guideway by using a double-bogey design, as has been used with conventional LSM designs (see, for example, U.S. Pat. No. 7,458,454, entitled "Three-dimensional Motion Using Single-Pathway Based Actuators," issued Dec. 2, 2008, and U.S. Patent Application 2007/0044676, entitled "Guideway Activated Magnetic Switching of Vehicles," published Mar. 1, 2007, the teachings of both of which are incorporated herein by reference), or by increasing the dimensions of guideway and vehicles.

Low, Friction Sliding Surface

Figure 6:
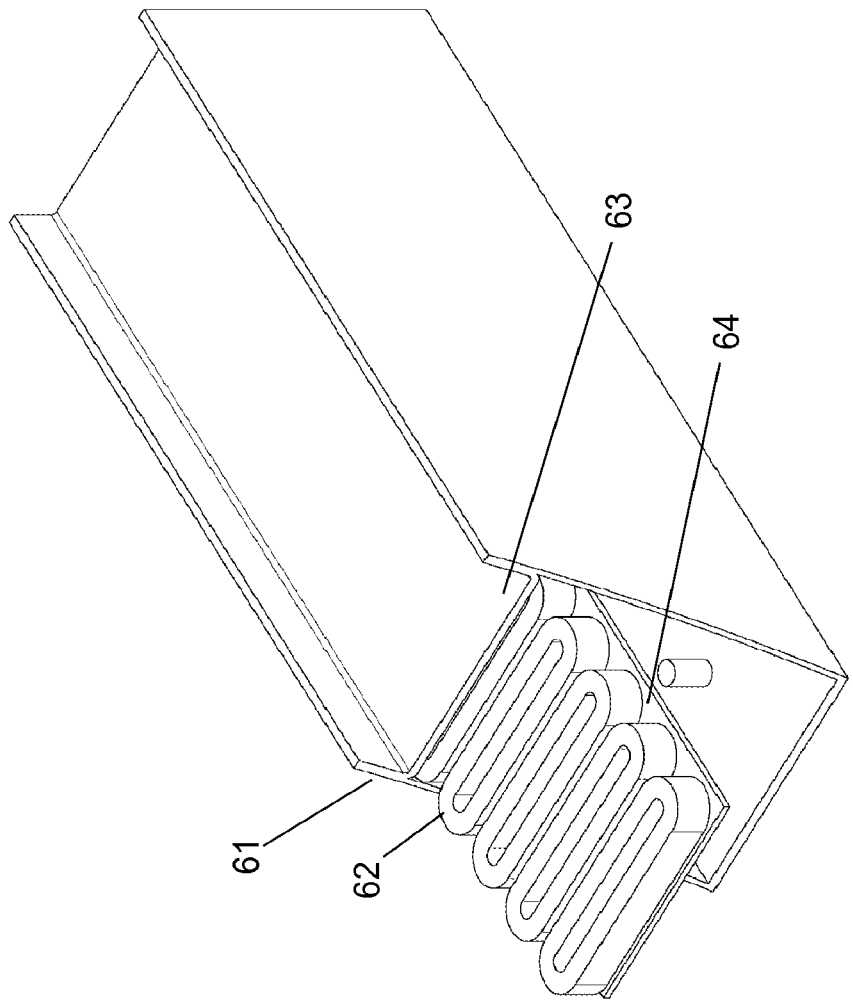
FIG. 6 shows a guideway according to one practice of the invention, including a printed circuit board, with propulsion coils mounted on it, in close proximity to the guideway surface, and connected to power control circuitry on the circuit board.

In order to reduce the required propulsive force and heating from friction, the vehicle and guideway of the illustrated embodiment are designed to minimize the coefficient of friction $c_f$, which is the ratio of the propulsive force needed to move the vehicle to the gravitational force of the vehicle on the guideway. In some cases wheels can be used as a way to reduce this force, but this invention allows the use of wheel-less vehicles. FIG. 6 shows the guideway with low friction running (or "sliding") surface 63 that supports vehicles in close proximity to the propulsion coils 64.

Examples of low friction for wheel-less applications include Teflon sliding on Teflon and Teflon sliding on stainless steel. Lower friction is possible if the surface can be lubricated by a thin film, but for many applications this is not allowable so the design assumes no lubrication. It is also preferable that the surface have good wear characteristics so, for example, we might use stainless steel on the guideway and Teflon on the vehicle with the expectation that there would be negligible wear on the steel but the vehicle might eventually need to have its sliding surface replaced, an action that is less expensive than replacing the guideway. Sliders 32 in FIG. 3 are examples of how low friction components can me mounted. They may be designed so as to be replaceable if it is expected that they will wear out before the vehicle reaches end of life.

With some designs $c_f$ can be as low a 0.1 but more practical values are in the range 0.15 to 0.2. Because this is a relatively high value it is preferred that the propulsive force not create substantial downward force on the vehicle. A typical LSM using ferromagnetic material will exert an attractive force that is four to six times the propulsive force and with this much attractive force the vehicle may not be able to move, or if it did move there would be substantial heating and power wasted in such instances, wheels, bearings or other rolling elements can be incorporated for suspension of the vehicles.

Magnet Array

There are many types of magnet arrays that can be used, one of which is shown in FIG. 3. With this design there is one middle magnet 33 that has the South pole on the lower surface and two half magnets 34 on the ends that have a North Pole on the lower surface. Typically the magnets use NdFeB in order achieve high fields but they can use other materials, such as ceramic when cost or external fields must be low or Samarium Cobalt when the operating temperature is high.

One design consideration is the interaction between magnets on adjacent vehicles. The ferromagnetic piece 35 largely prevents magnetic fields from adjacent vehicles from interfering with each other.

FIG. 4 shows a Halbach Array which can be used where higher force is required and the added cost is acceptable. With this design the magnetic field rotates from one magnet to the next with a resulting higher propulsive force than is possible with the magnet design in FIG. 3. Ferromagnetic shield 43 minimizes interactions between the fields of adjacent vehicles.

FIG. 5 shows a single magnet providing all of the magnetic flux with ferromagnetic material on the ends used to provide a return path. This may not produce as much force but can be less expensive than multi-magnet designs.

Linear Motor Propulsion

FIG. 6 shows coils 64 mounted in close proximity to the guideway running surface 63. Currents in these coils are individually controlled via power electronic components and microprocessors so that each vehicle can be individually controlled even when it is touching neighboring vehicles.

A feature of the illustrated embodiment is the lack of ferromagnetic material that is commonly used in an LSM to make it more efficient. With no ferromagnetic material we can not achieve as high a force, but we can limit the attractive force to a small fraction of the propulsive force and thereby allow strong acceleration and braking forces to move the vehicle when the coefficient of friction is on the order of 0.2 or higher.

In embodiments that use wheel-based vehicles the friction force may be small enough that some ferromagnetic material can be used in the stator so as to achieve higher propulsive force.

Software for controlling the microprocessors can be similar to control software used on LSM designs with blocks that are several coils long. Here, however, position sensing components are located close enough together that they can identify individual vehicles even when the vehicles are touching. Such sensing facilitates control of the movement of the vehicles independently of one another on the guideway. Prior demonstrations of locally commutated LSMs have shown that this software does not require special features.

PC Board Mounted Coils and Control Circuitry

Figure 7:
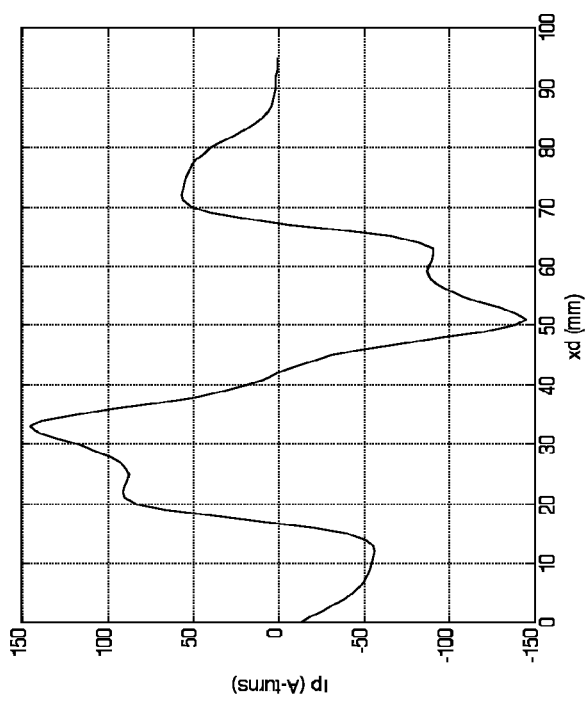
FIG. 7 shows a typical waveform of current in a coil as a vehicle moves by in a system according to one practice of the invention.
Figure 8:
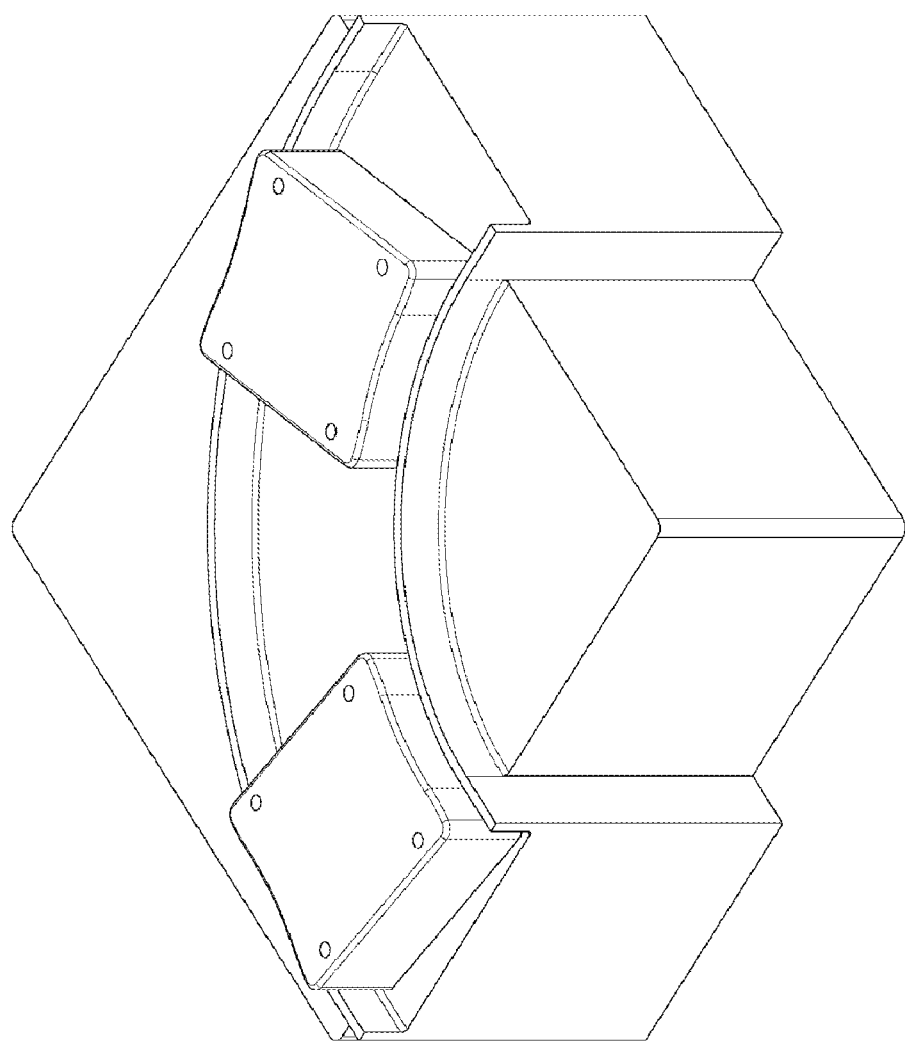
FIG. 8 shows vehicles negotiating a sharp 90° horizontal turn in a system according to one practice of the invention.

The illustrated embodiment permits the control of each coil individually without the cost associated with conventional designs. With reference to FIG. 6, there is shown an embodiment in which the coils 62 are mounted directly on a Printed Circuit Board (PCB) 64. This board supports the coils and provides connections between the coils and the power electronic modules that control the current. Typically each coil is connected to the output of an "H-bridge" with MOSFET or IGBT devices used to control the amount and direction of current in each coil. These components are mounted on the same PCB. The PCB also holds Hall Effect devices that sense the magnetic field produced by the vehicle and allow a microprocessor to create a desired force. FIG. 7 shows a typical waveform of the current in a propulsion coil that will propel a vehicle as it moves by the coil. By proper choice of waveform several propulsion coils can work in unison to create a constant force on the vehicle with minimum power loss in the coil. For braking the sign of the current is reversed.

By mounting the coils directly on a PC board and by using integrated power controllers it is possible to reduce the cost for the coils and electronics. One microprocessor can control a multiplicity of H-bridges but with a coil spacing on the order of 16 mm there can be more than a dozen microprocessors per meter of motor, and the operation of these motor controllers must be coordinated by a higher level "node" controller. With modern semiconductor technology, and for low to moderate power levels, all of these components can be mounted on only one or two PCBs that are contained in the motor housing.

Guideway Modules

The guideway is built of modules much as a model train layout is constructed from modules. FIGS. 6, 8-11 and 13 show examples of a straight section, a 90° horizontal curve, a 180° vertical curve, a right diverge switch, a turntable, and a vertical transition. These components can be interconnected in a variety of ways to meet the requirements of many and diverse applications.

Figure 9:
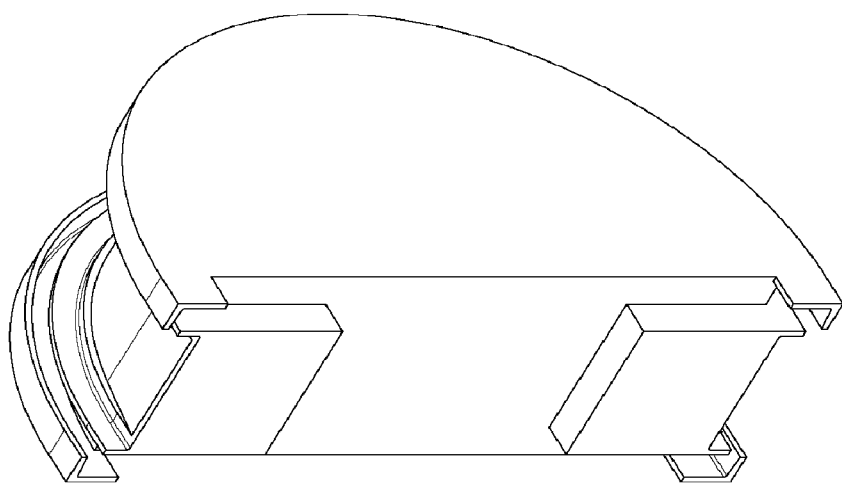
FIG. 9 shows vehicles negotiating a sharp 180° vertical turn in a system according to one practice of the invention.

The 180° vertical curve in FIG. 9 is primarily used as a means to return empty vehicles to a starting point and vehicles negotiating this curve may be controlled and propelled by other means than an LSM. For example, vehicles going down may be propelled by gravity and vehicles going up may be propelled by interaction with a mechanical mechanisms and in both cases there may not be precise control during the curve transition. It is preferable that once the vehicles have negotiated this curve precise control is regained. In some cases there is a vertical curve with a much larger curve radius, such as used as a transition between a level guideway and an inclined guideway. (See, for example, FIG. 13). In this case LSM propulsion can be used for the vertical curve and thereby retain precise control through the curve.

Figure 10:
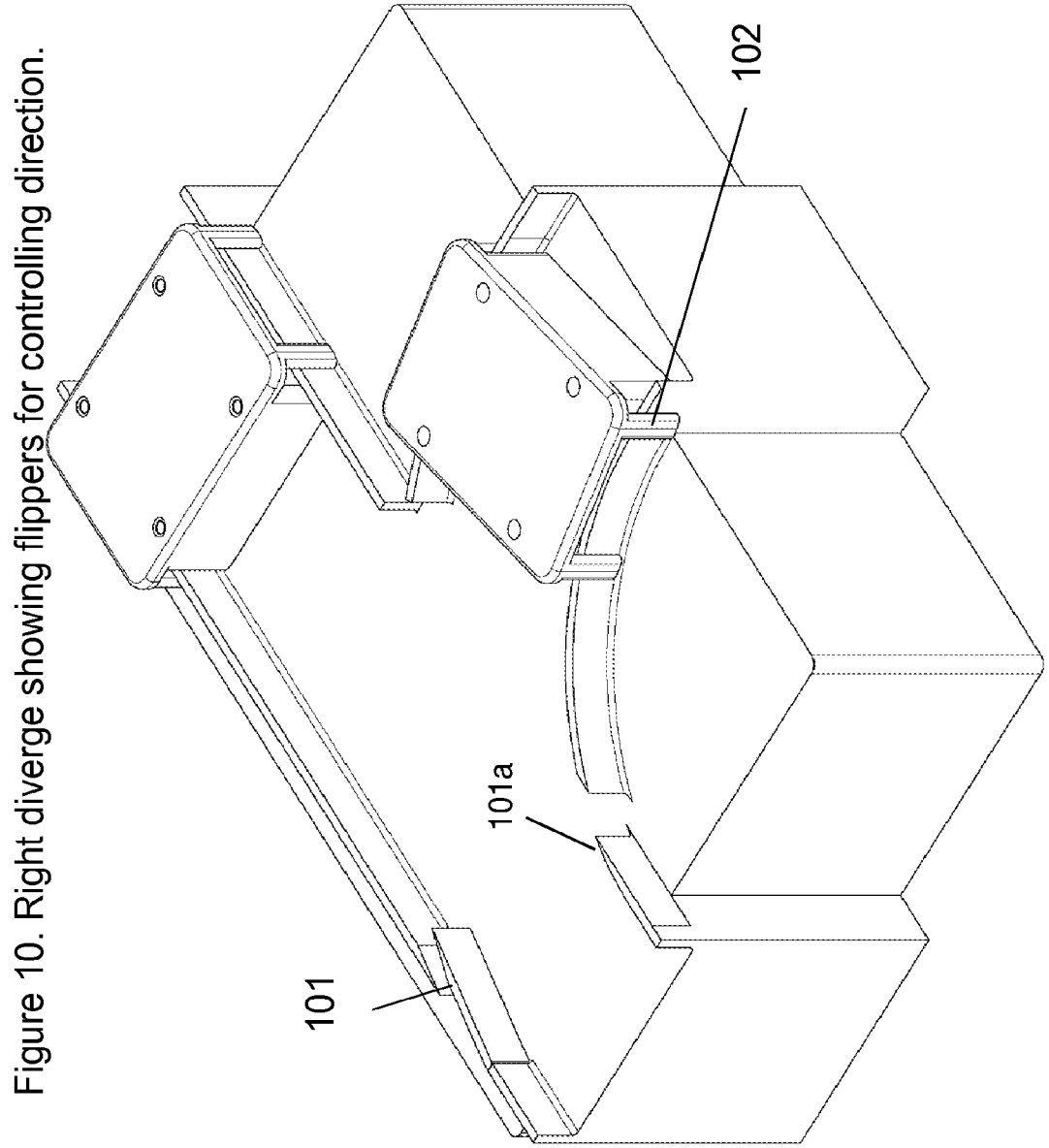
FIG. 10 shows a right diverge in a system according to one practice of the invention with vehicle direction determined by the position of a small flipper.

FIG. 10 shows a right diverge using a small mechanical or magnetic flipper 101 that directs a moving vehicle to go either straight ahead or diverge to the right. The flipper is controlled by a linear or rotary actuator that interacts with pins 102 on the vehicle to steer the vehicle in the correct direction. The same device can be used to merge two streams of vehicles. The flipper is small and light so it can move from one position to another in a small fraction of a second and thereby allow high throughput with adjacent vehicles able to be switched independently. A left diverge can be constructed as a mirror image of the right diverge.

Figure 11:
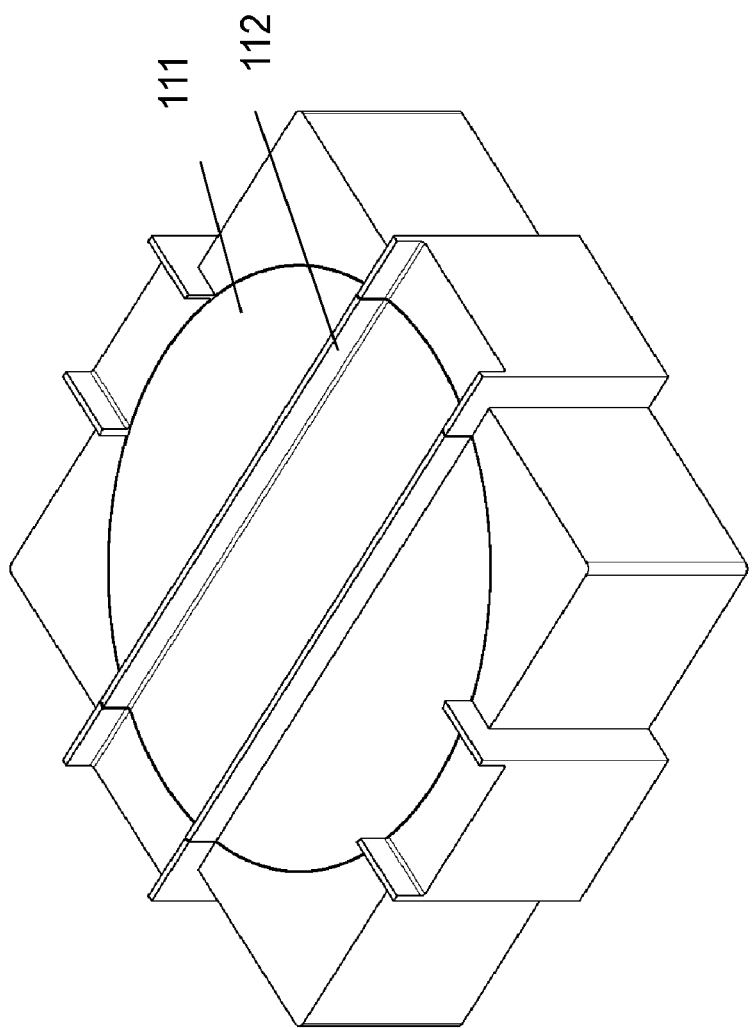
FIG. 11 shows a turntable which can be used in a system according to one practice of the invention in lieu of a curve to effect diverge and merge operations.

FIG. 11 shows a turntable 111 as an alternative to the flipper. Guidance rails 112 on the turntable and propulsion coils, not shown, guide and propel the vehicle. The turntable in FIG. 11 can rotate in 90° increments, but other designs can support motion for a variety of angles. The turntable tends to be slower than the flipper because of the added mass, but is less expensive for some applications and has greater versatility because it can be used in lieu of curves as well as to reverse vehicle direction and switch between a multiplicity of tracks.

Figure 13:
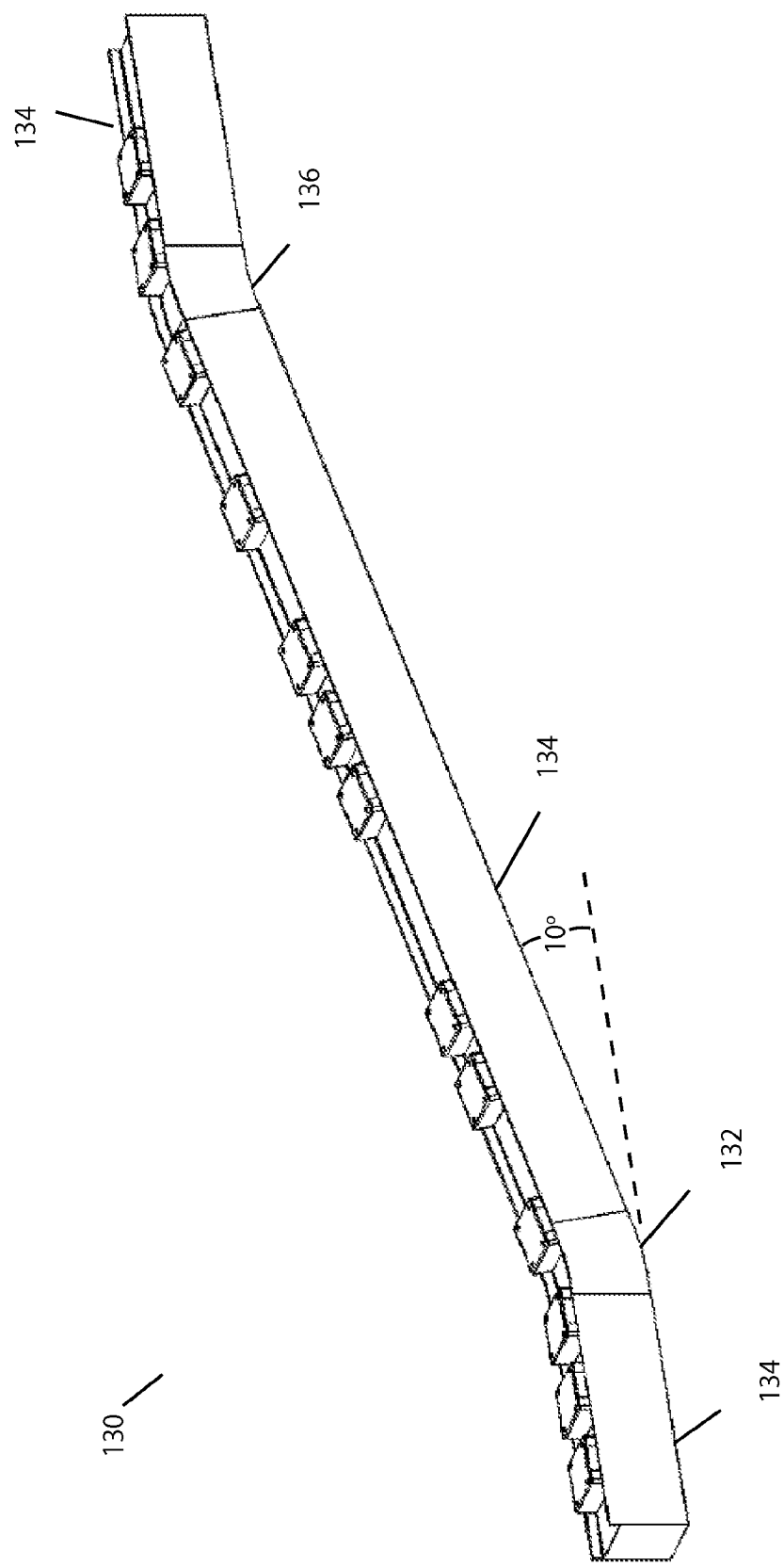
FIG. 13 shows a vertical transition in a system according to one practice of the invention.

FIG. 13 depicts a vertical transition 130. In the illustrated embodiment, this includes a concave transition piece 132, straight sections 134 and a convex transition piece 136, coupled as shown. The illustrated transition is 10° along the vertical axis, though, in other embodiments greater or lesser angles may be employed. Although the angle of the vertical transition shown here is established by transition pieces 132, 136, in other embodiments the transition may be defined by other pieces (e.g., incorporated into diverges, straight-sections, and so forth).

The switching function can also be provided by magnetic forces acting on the vehicle. For example, coils on and near the guideway can be controlled so as to create lateral forces that will perform the switching function. This approach to switching is described in U.S. Patent Application US 2007/0044676, entitled "Guideway Activated Magnetic Switching of Vehicles," the teachings of which are incorporated herein by reference.

Figure 12:
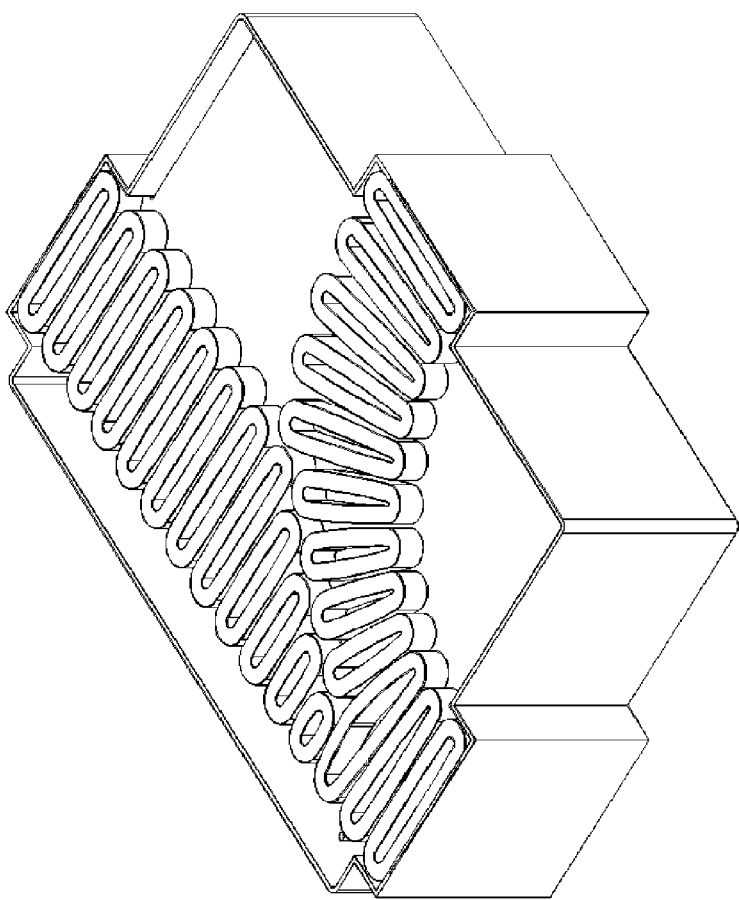
FIG. 12 shows propulsion coils providing continuous force on vehicles moving on a right diverge module of a system according to the invention.

FIG. 12 shows a cutaway view of a guideway diverge module showing propulsion coils for propelling vehicles on either of two paths. This continuous propulsion through a diverge or merge is essential to providing precise position control at all times.

A further appreciation of techniques for packaging the linear motor and other module components of the guideway modules may be attained by reference to U.S. Pat. No. 6,578,495, entitled "Modular Linear Motor Tracks and Methods of Fabricating Same," assigned to the assignee hereof, the teachings of which are incorporated herein by reference.

Application Example

Figure 14:
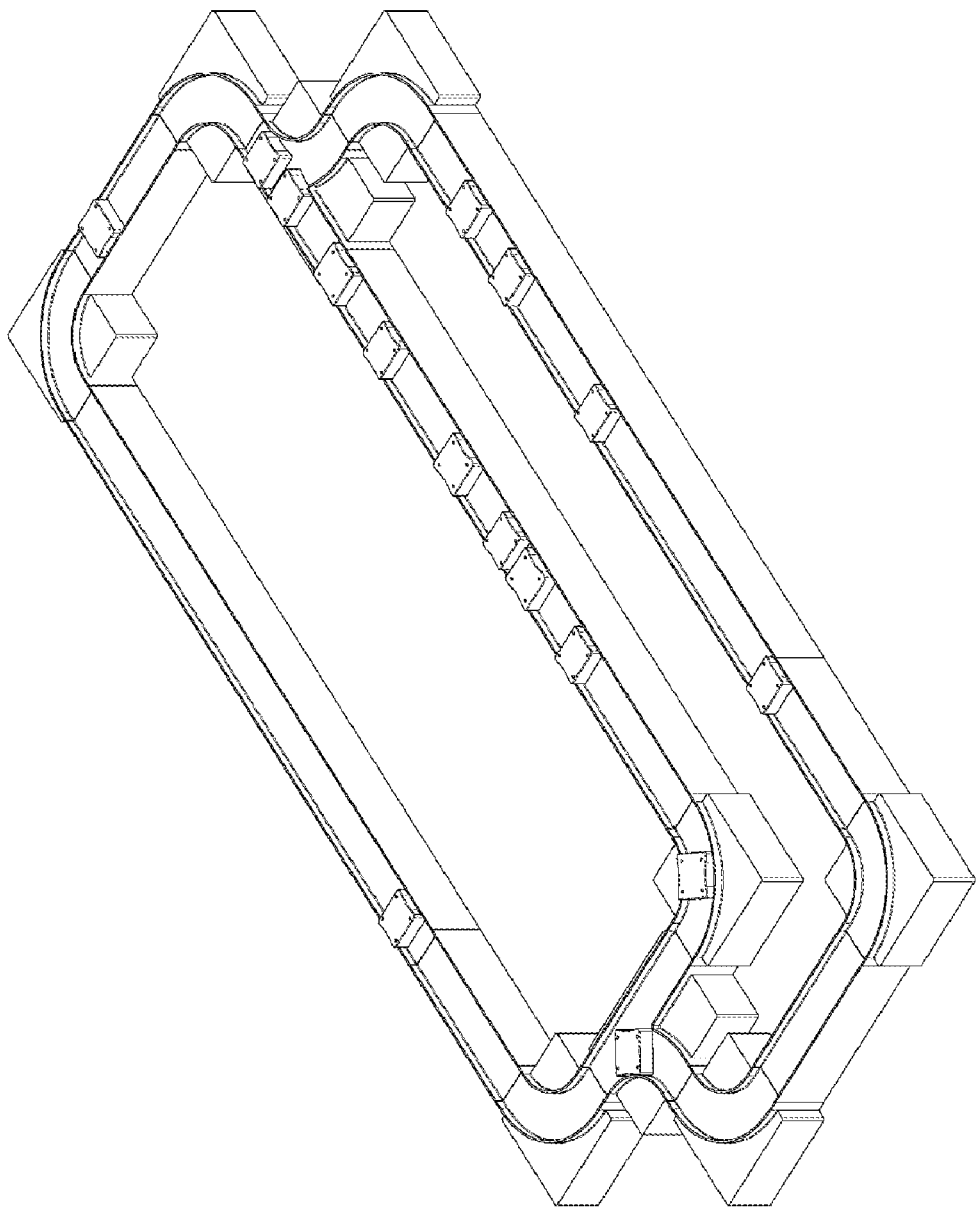
FIG. 14 shows an example of a system according to the invention.

There are many possible applications but the simple layout in FIG. 14 shows how the guideway modules can be interconnected. Vehicles move around the main loop but can move though a bypass when desired. Typical applications will use many more guideway modules than in this simple example.

Additional Embodiments

As evident in FIGS. 1-14, in some embodiments the running or sliding surface of the guideway comprises an upper surface of the guideway immediately adjacent the propulsion coils, for example, as indicated by surface 63 and coils 64 of FIG. 6 and discussed above. In other embodiments, such a running or sliding surface can be another upper-facing (or vehicle-contacting) surface of the guideway—for example, a surface of a rail, ledge, recess, or flange of the guideway. That surface can be immediately adjacent to the coils 64 or offset therefrom.

Figure 15:
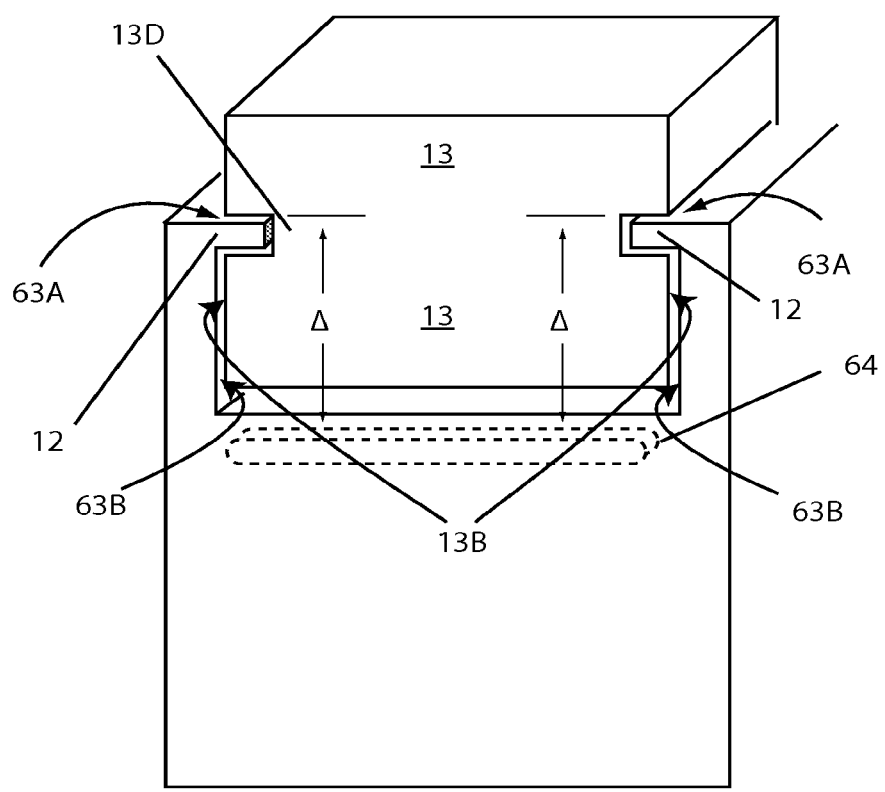
FIGS. 15-16 shows a guideway and vehicle in a system according to one practice of the invention.
Figure 16:
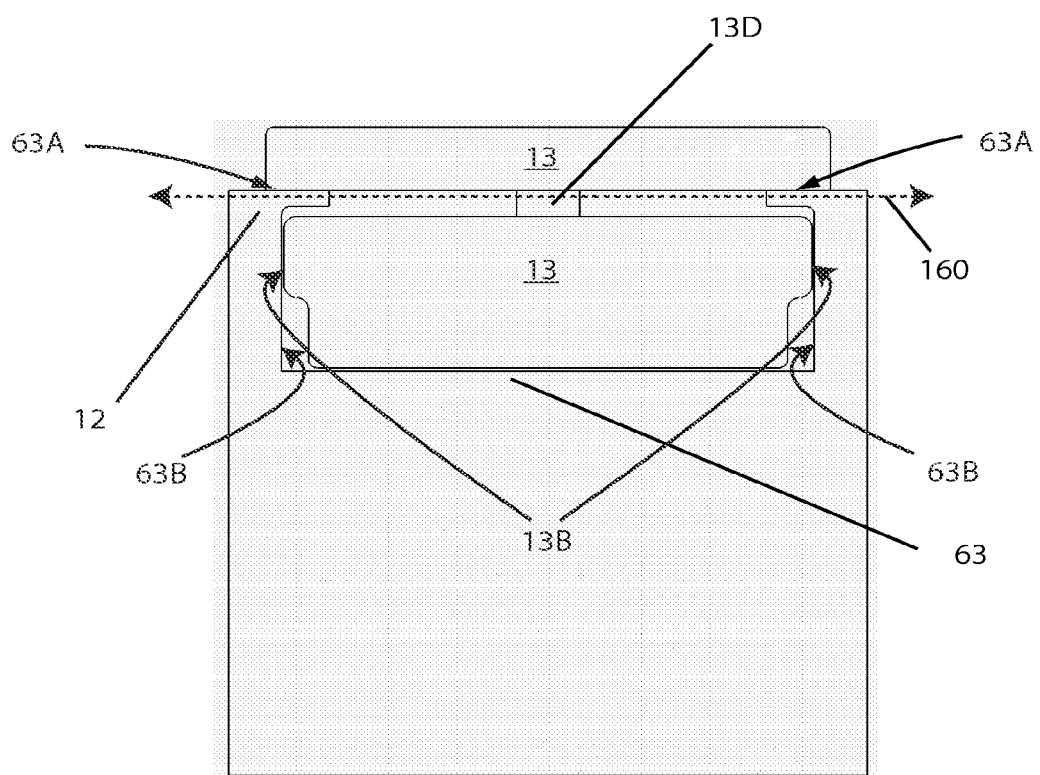

This is shown, for example, in FIG. 15, wherein surfaces 63A, which are offset from the coils by a distance A provide low friction running (or "sliding") surfaces that support the vehicle 13. The two surfaces 63A are shown in the drawing, other embodiments may incorporate fewer or greater such surfaces in (or out) of combination with other surfaces, such as surface 63 of FIG. 62. This is shown, for example, in FIG. 16. In the embodiments of FIGS. 15 and 16, running surfaces 63A of the guideway form part of guidance rails 12, though, in other embodiments these may comprise separate structures of the guideway (or otherwise).

Likewise, as also evident in FIGS. 1-14, in some embodiments the running or sliding surfaces of vehicles 13 can be provided by sliders 32 or other components of the vehicles), for example, as indicated by FIG. 3 and discussed above. In other embodiments, such running or "sliding" surfaces can be other downward-facing (or guideway-contacting) surfaces of the vehicles—for example, surfaces of rails, ledges, recesses, or flanges of the vehicles. This too is shown, for example, in FIG. 15, wherein surfaces 32A provide low friction running (or "sliding") surfaces that slide on the running or sliding surface of the guideway, here, surfaces 63A.

In embodiments such as those shown in FIG. 15, as well as in other embodiments of the invention, the sliding surfaces 32A, 63A, and so forth, are sized and otherwise designed to minimize the coefficient of friction $c_f$, as discussed above, as well as to provide adequate support for the vehicles 13 under expected operating conditions.

Figure 17:
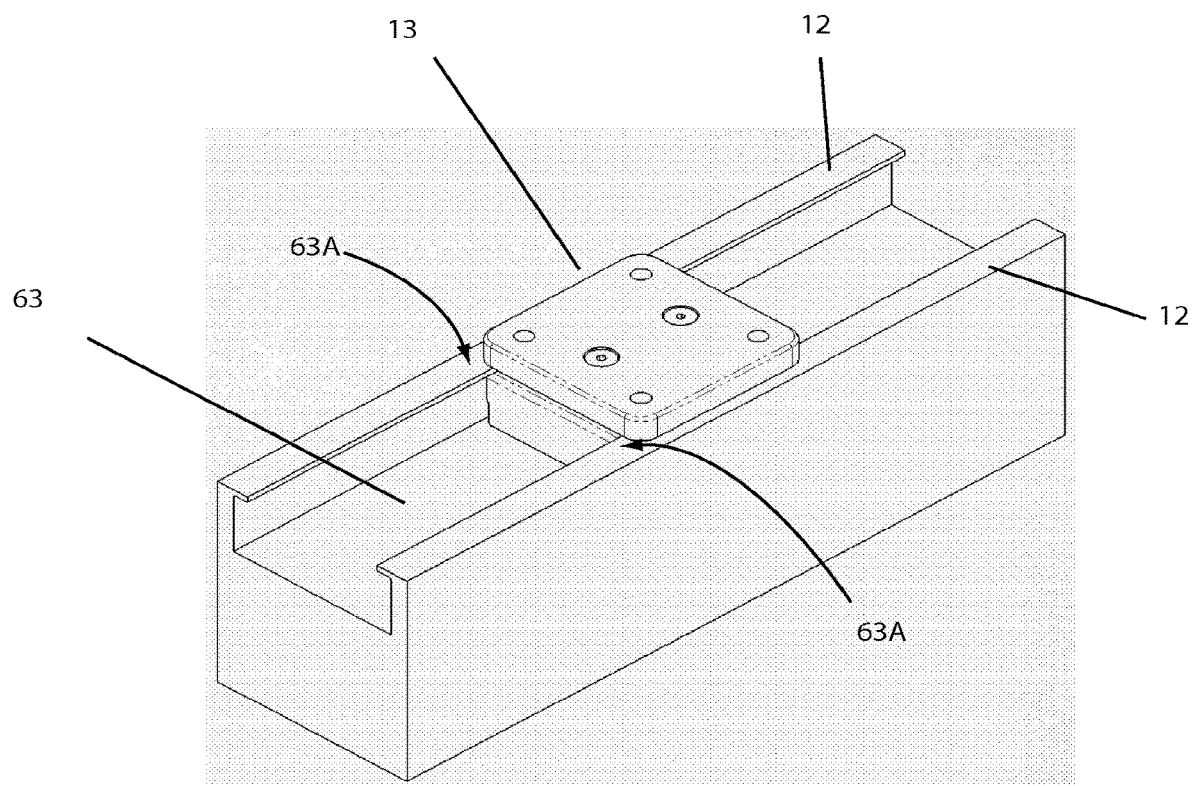
FIG. 17 is a perspective view of a straight-away section of a guideway in a system according to one practice of the invention.
Figure 18:
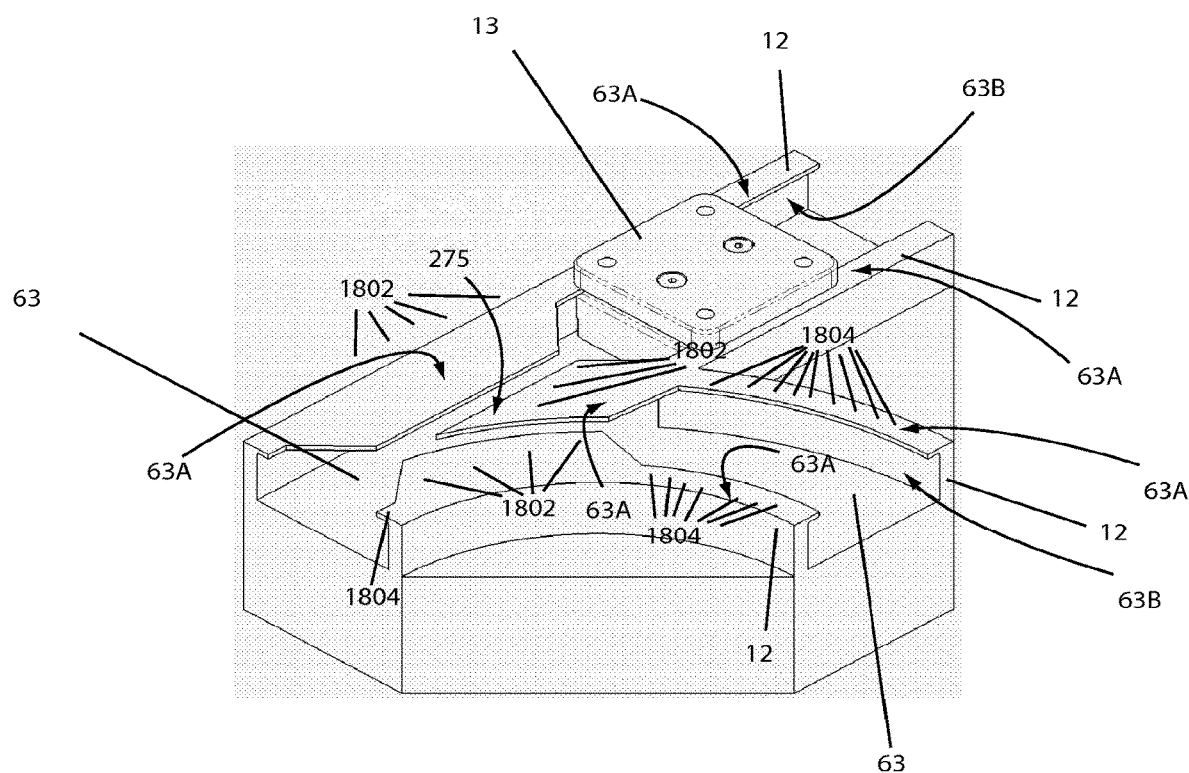
FIG. 18 is a perspective view of a right-diverge section of a guideway in a system according to one practice of the invention.

A further appreciation of the embodiments shown in FIGS. 15-16 may be attained by reference to FIG. 17, which is a perspective view of a straight-away section of a guideway of such embodiments; FIG. 18, which is a perspective view of a right-diverge section of a guideway of such embodiments; FIGS. 19A-19D, which are perspective views of straight-away, left-diverge, vertical turn, and curve sections of a guideway of a such embodiments.

In regard to FIG. 18 and other sections that support a merge or diverge function, the running services 63A of rails 12 can be broadened and/or narrowed, e.g., as shown in the drawing, in order to provide greater a guidance or channeling function.

As evident in the discussion above and shown in the drawings, switching can be effected via turntables, as well as by the use of mechanical flippers or magnetic switching members acting at or near merge or diverge regions of the guideway. Guideway configurations utilizing the latter are more fully detailed in FIGS. 20A-20B and 21 and discussed below. Though only diverge sections are shown in those drawings, it will be appreciated that flipper and switch arrangements as shown herein can be employed with other guideway modules and/or configurations, as well.

Figure 20A:
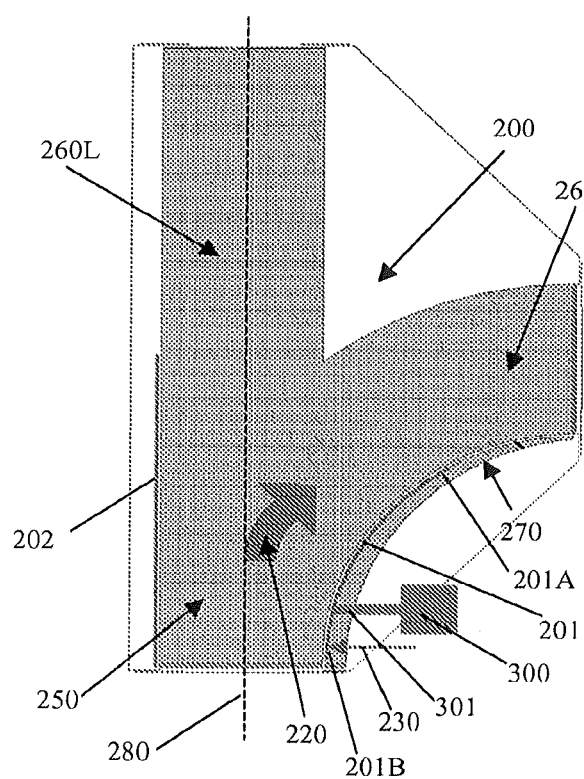
FIGS. 20A-20B show a top view of a right-diverge section of a guideway in a system according to one practice of the invention.
Figure 20B:
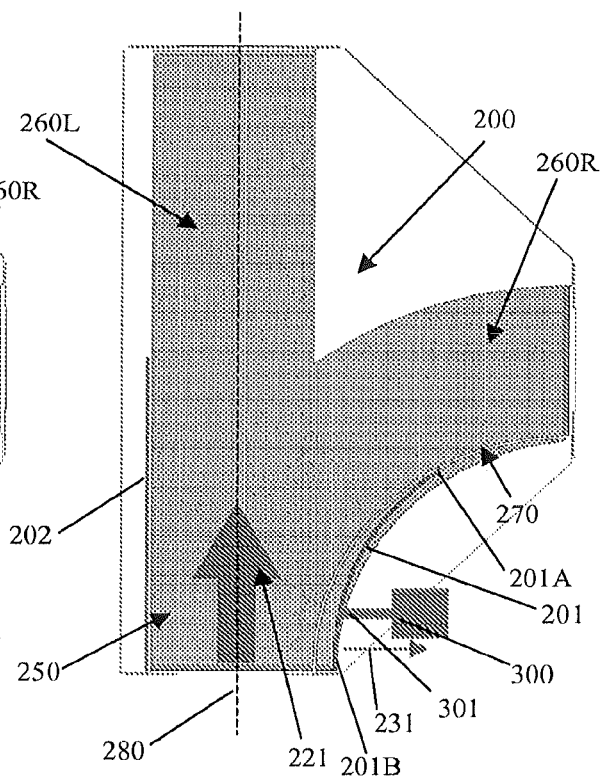

Referring to FIGS. 20A and 20B, there is shown a diverge or switching region of a guideway according to one practice of the invention. The illustrated diverge region 200, which may comprise one or more modules of the type described above (albeit configured and operated as discussed here), comprises an ingress path 250 and two or more egress paths, here, egresses 260L and 260R, as shown. A switching member, e.g., flipper 201, is disposed along a lateral (or outside) portion 270 of the guideway region 200 and, indeed, can be disposed within a lateral (or side) rail 270 of the guideway, as shown. In other embodiments, the switching member 201 may be disposed on a medial portion of the guideway 275, e.g., at or closer to a centerline 280 of travel of vehicles moving thereon, or otherwise. Regardless, the flipper 201 (or other switching member) is preferably disposed along the guideway at a location at or near a point where the egresses diverge from one another (e.g., the branch-point or crotch of the diverge).

The switching member 201 comprises a ferromagnetic material suitable for effecting magnetic attraction between the member 201 and a passing vehicle—i.e., a vehicle that is moving on the guideway in vicinity of the member 201 (e.g., near the branch-point of the diverge)—e.g., in a direction transverse to the vehicle's direction of motion along the guideway and, thereby, selectively altering the course of the passing vehicle. In the illustrated embodiment, such attraction is particularly effected between the member 201 and a permanent magnet disposed on such a vehicles, though, in other embodiments, attraction may be to other magnetic elements on the vehicle. Illustrated switching member (here, flipper 201) is shaped as a flat, rectilinear member, though, in other embodiments it may be shaped otherwise.

Referring to FIGS. 20A and 20B, an actuator 300 is coupled (e.g., via rod 301 or otherwise) to the switching member 201 in order to place the switching member in a first position (and, more generally, in a first configuration), whereby the switching member exerts a greater lateral magnetic attractive force on the passing vehicle and, thereby, causes it to exit the diverge region 200 via one of the egresses, place the switching member in a second position (and, more generally, in a second configuration), whereby the switching member exerts a lesser lateral magnetic attractive force on the passing vehicle and, thereby, causes it to exit the diverge region 200 via another of the egresses (e.g., the straightaway egress), move the switching member 201 between the first and second positions (or configurations).

The actuator may comprise a servo, solenoid, lever, spring, motor, or other mechanism (or combination thereof) of the type known in the art suitable for so placing and moving the switching member. The actuator may operate under control of a microprocessor or other control device (not shown) of the conventional type known in the art (as adapted in accord with the teachings hereof) to route the passing vehicle passing through diverge region.

With reference to FIG. 20A, the actuator 300 is shown positioning flipper 201 in the first configuration—here, pivoted on a fixed end 201A (e.g., on pin or other pivot member) such that a free end 201B is rotated into a first rotational position—in order to effect passage of the vehicle (here, represented by arrow 220) to egress 260R. With reference to FIG. 20B, the actuator 300 positions flipper 201 in the second configuration—here, pivoted on fixed end 201 such that a free end 201B is rotated into a second rotational position in order to effect passage of the vehicle (here, represented by arrow 221) to egress 260L.

As evident in these drawings, the first and second configurations of the illustrated embodiment represent differing rotational positions of the flipper 201 that place the free end 201B closer (in the case of FIG. 20A) and further (in the case of FIG. 20B) to the passing vehicle and which, thereby, effects differing attractive forces on it. In other embodiments, other configurations may be utilized instead or in addition. By way of example, the free and fixed ends of the flipper 201 of may be reversed (e.g., from that shown in the drawing). By way of further example, the actuator may be coupled with the flipper (or other switching member) so that the entire member 201 (as opposed to merely a free end) is disposed closer to vehicle in the first configuration and further in the second configuration. By way of still further example, the flipper or other member may be flexible and the actuator may be disposed so as to cause it to bend so that portions of it are closer to the vehicle in the first configuration and to bend further from the vehicle in the second configuration. These and other alternatives will be evident to those of ordinary sill in the art in view of the teachings hereof.

Though only a single moveable switching member 201 is shown in the drawings and described above, it will be appreciated that another such member may be provided, as well. This may be, for example, a moveable switching member that is like member 201, but that is disposed along a lateral portion of the guideway region 200 opposite member 201 (along the guideway at a location at or near the branch-point or crotch of the diverge) and that moves in cooperation with illustrated member 201 to facilitate routing the passing vehicle to the first or second egresses.

Alternatively, the further member may be a non-moveable (or fixed) member—such as a permanent magnet or other ferromagnetic element that effects a magnetic attraction force on the passing vehicle sufficient to bias it toward a one of the egresses, thereby, insuring routing of the vehicle to that egress, when the switching member 201 is not positioned (by the actuator 300) to effect routing to the another egress. Such a fixed element may be disposed along a lateral portion of the guideway region 200 opposite illustrated switching member 201 or otherwise (e.g., on a medial portion of the guideway). As with moveable member 201, the non-moving member disposed along the guideway at a location at or near the branch-point or crotch of the diverge, and it may be shaped as a flat, rectilinear member—or otherwise.

Further appreciation of the exemplary switching embodiment discussed above can be attained by reference to FIG. 21, which is a cut-away perspective view of a right-diverge section 200 of a guideway similar to that shown in FIG. 18. Portions of the guidance rails 12 and the surfaces 63A are not shown in FIG. 21 so that the flipper 201 and fixed-plate non-moveable member 202 of the type discussed above can be seen. As illustrated, the flipper 201 is disposed in a gap 210 between opposed portions of the guidance rails 12.

A further appreciation of the embodiments discussed above may be attained by the following remarks:

The operation of illustrated diverge region 200 depends on the attraction forces between permanent magnet on the vehicle and the ferromagnetic plates on the side of the guideway. The magnets one the vehicle are primarily used to produce a field below the vehicle for propulsion, but there is a strong enough field on the side of the vehicle to create enough force for controlling the vehicle direction. If desired, additional magnets could be added solely to facilitate switching.

As discussed above, FIG. 21 shows a small fixed plate 202 on the side of the straight side of the diverge 200 and a movable plate 201 on the diverge side. If it is desired that the vehicle go straight, the movable plate 201 can be positioned several millimeters from the edge of the guideway so there is not much force tending to pull the vehicle into the diverge. In this case the plate 202 on the straight side ensures that the vehicle goes straight. If it is desired that the vehicle diverge, than the movable plate 201 can be positioned in close proximity to the edge of the guideway and, because the movable plate 201 is larger than the fixed plate 202, there is a net force pulling the vehicle into the diverge path. As the vehicle begins to diverge, the differential force increases and becomes large enough to counter the centrifugal force of the turning vehicle.

There are several ways in which the movable plate 201 can be controlled. For example, it can be attached to a pivot and driven by a rotary motor, or it can be moved laterally by magnetically based forces.

In some embodiments, the switching function is provided by magnetic forces applied to a vehicle traveling on the guideway. The magnetic forces can be used to control the direction of a vehicle at a diverge region of the guideway or at a merge region of a guideway. For example, one or more switching members, e.g., a flipper, can be disposed on the guideway. The one or more switching members can be configured so that when at least one of the one or more switching members is activated, e.g., by moving, a magnetic flux between the at least one of the one or more switching members and a magnetic flux source on the vehicle is changed. For example, the switching member can move by pivoting, translating, bending, or any combination thereof.

The magnetic flux source on the vehicle can include permanent magnets or electromagnets. The magnetic flux source used for switching can also be used to provide the means for LSM propulsion. However, the vehicle can also include additional and separate permanent magnets or electromagnets configured to provide a magnetic flux source separate from any magnetic flux source used for propulsion.

Discussed above are diverge regions that utilize magnetic switching members acting at or near merge or diverge regions of the guideway. It will be appreciated that the illustrated embodiment is just an example of transport systems and modules providing such regions. Thus, for example, though the moveable and fixed switching members referred to here effect magnetic attraction with a vehicle in the vicinity thereof on the guideway, in other embodiments, one or more of the switching members may rely on magnetic repulsion instead. And, though the illustrated diverge region has straight and branched egresses, diverge regions of other embodiments may be of different configuration. For example, the diverge region may be Y-shaped. Moreover, it may have (instead or in addition) additional egresses.

Recap

Discussed above and as evident in FIGS. 15-18 and 21 and discussed in connection therewith, the running or sliding surface of the guideway can be offset from coils 64, as well as from a surface 63 adjacent thereto. Such is the case, for example, with respect to low friction running surfaces 63A, e.g, comprising ledge or flange portions of guidance rails 12, shown in the embodiments of those drawings and discussed above.

Running surfaces that form part of the vehicle 13 run or slide over those guideway surfaces and, more particularly, in the case of the embodiments illustrated in those drawings, those surfaces on the rails 12. As discussed elsewhere herein, those running surfaces on the vehicle may include sliders or other components (e.g., wheels, bearings or other rolling elements) that facilitate their movement over the surfaces 63A.

With further attention to FIGS. 15-18 it can be seen that those running surfaces (of the vehicle) are disposed within and, indeed, in the illustrated embodiment form part of recesses on the body of the vehicle. This may be a groove of the type in which rails 12 are shown disposed in FIG. 15 or a deeper recess of the type in which such rails are shown in FIG. 16, all by way of example. That recess (whether a groove or otherwise) defines a narrowed portion of the body of vehicle 16 which may be referred to as "septum." In the embodiment of FIGS. 15 and 16, the septum 13D is the portion of the vehicle that couples the upper section with running surfaces and load (e.g., an article being carried by the vehicle) to the lower section with guidance surfaces 13B and the magnet array that provides propulsion; though, other embodiments may vary in this regard.

Referring to FIG. 15 (which shows a lateral cross-section of a vehicle 13 and guideway), septum 13D can be sized somewhat smaller in the lateral dimension than (i) the portion of the body vehicle 13 that resides within the guideway, and/or (ii) the portion of the body vehicle 13 that resides outside the guideway. By comparison, referring to FIG. 16 (which, too, shows a lateral cross-section of a vehicle 13 and guideway), such a septum 13D can be sized substantially smaller in the lateral dimension than (i) the portion of the body vehicle 13 that resides within the guideway, and/or (ii) the portion of the body vehicle 13 that resides outside the guideway.

In addition to running surfaces 63A (which support the vehicles and along which they slide or roll), rails 12 of the guideways shown in FIGS. 15-18 and 21 can have guidance surfaces 63B that constrain motion of the vehicles laterally. (Such guidance surfaces need not be included in embodiments such as shown in FIG. 10, since the pins 24,31 can serve a guidance function, as well). In the illustrated embodiment, the guidance surfaces are substantially normal to the running surfaces, though, some embodiments may vary in this regard.

One or more of these guidance surfaces can be disposed with sufficient clearance from the vehicles' corresponding surfaces 13B on the body (as opposed to the septum) of the vehicle as to permit the vehicles generally to move without contacting those surfaces 63B, yet, to provide guidance if and as need arises to keep the vehicles on the guideway, e.g., during merge/diverge operations, in the event of uneven vehicle loading, wind gusts, and so forth. Alternatively, one or more of the guidance surfaces 63B can be disposed so as to be in substantially constant contact with corresponding surfaces 13B of the vehicles 13 traveling on the guideways and, thereby, so as to provide substantially constant guidance.

To all of these ends and the foregoing, the surfaces 63B can be sliding surfaces that minimize the coefficient of friction, c.f., with surfaces 13B of the vehicle—which surfaces 13B, themselves, may be low-friction surfaces and/or may include sliders or other components (e.g., wheels, bearings or other rolling elements) that facilitate their movement over the surfaces 63B.

A guideway according to the invention may incorporate merge and/or diverge regions to alter the course of passing vehicles. One such guideway is shown in FIG. 10 for use with vehicles, e.g., of the type shown in FIGS. 2, 3, having pins 24, 31 extending from corners thereof near where the running surfaces that form part of the vehicle 13 run or slide along running surfaces of the guideway. Those pins interact with a flipper 101 disposed hear one of the rails, as well as with the corresponding section 101a of the opposing rail, to control direction of motion in a diverge of the type shown in FIG. 10. (In some embodiments, extensions other than pins may be used for the same purpose.) As noted there, the flipper 101, which may be mechanical or magnetic and which may be controlled by a linear or rotary actuator, interacts with pins 102 on the vehicle to steer the vehicle in the correct direction. As further noted, the same mechanism can be used to merge two streams of vehicles.

Figure 19A:
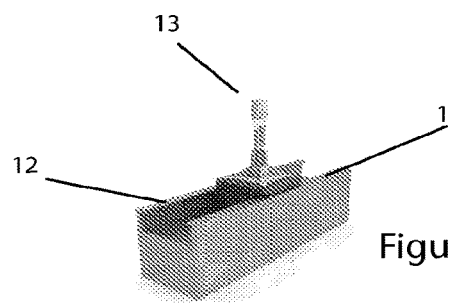
FIGS. 19A-19D show alternate configurations of sections of a guideway in a system according to one practice of the invention.
Figure 19B:
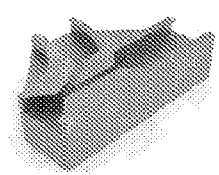
Figure 19C:
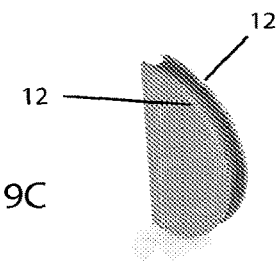
Figure 19D:
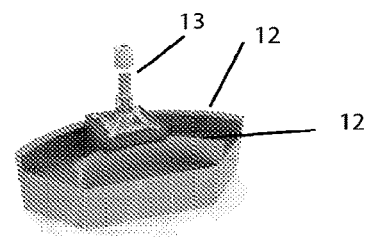
Figure 21:
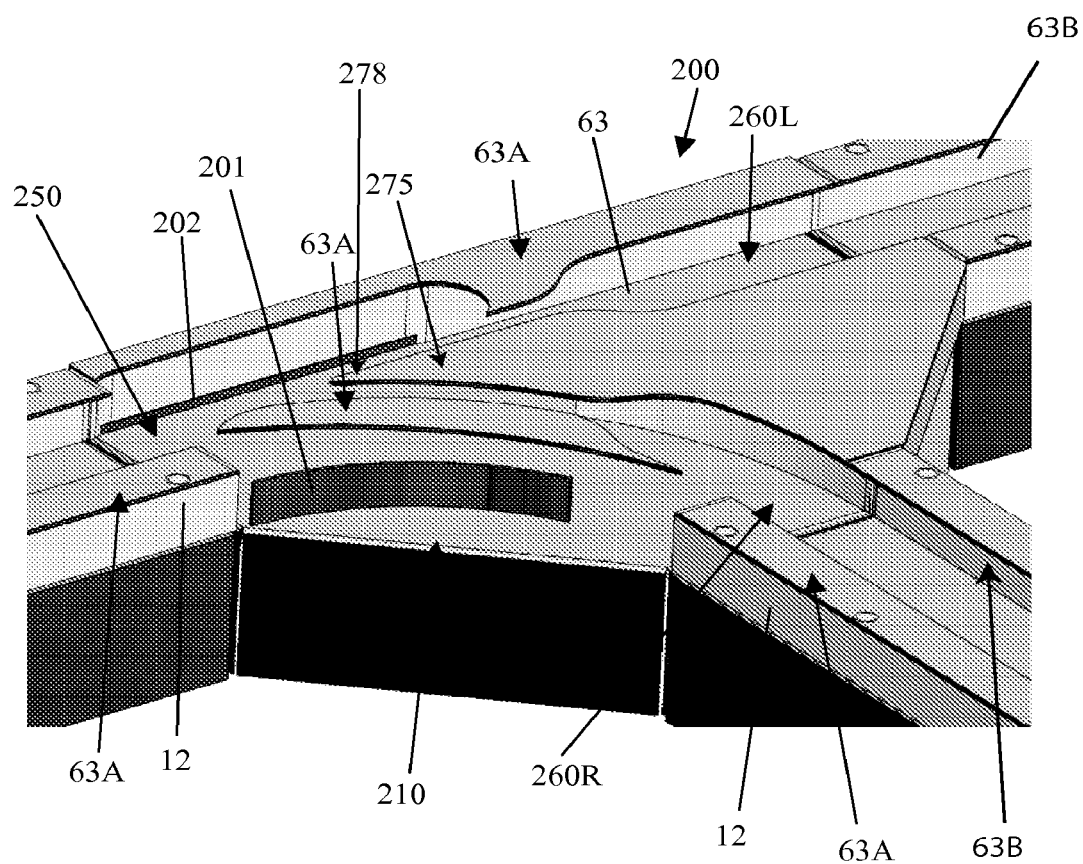
FIG. 21 is a cut-away perspective view of a right-diverge section of a guideway in a system according to one practice of the invention.

Further such merge/diverge regions are shown in FIG. 18, 19B, and 21 for use with vehicles of the type shown in FIG. 16 having a narrower septum. As evident, those merge/diverge regions have running surfaces 63A that broaden (e.g., as indicated by regions 1802) and narrow (e.g., as indicated by regions 1804) to provide (e.g., in the case of broadened regions) greater guidance or channeling of the vehicle. A ferromagnetic flipper 201 for use in these configurations is shown, by way of example in FIG. 20 and described in the accompanying text. As noted above, it is coupled to a servo-, solenoid-, lever-, spring-, motor- or otherwise-controlled actuator that places the flipper 201 in first or second configurations whereby it exerts greater or lesser lateral magnetic attractive forces on the passing vehicle and that, thereby, determines its direction—that is, for example, whether it travels from the ingress pathway of a diverge region to a first egress of that region or, alternatively, whether it is diverted to a second egress of that region.

In the illustrated embodiment, the direction of motion of a vehicle at ingress is substantially the same as that of a vehicle at the first egress and, hence, the motion to that egress from the ingress is considered "straightaway" motion for purposes hereof. Conversely, the direction of motion of a vehicle at the second egress is at an angle vis-a-vis that of a vehicle at the ingress and, hence, the motion to that egress from the ingress is considered diverted or switched. Other embodiments may vary in these regards, e.g., such that the directions of motion of vehicles at both egresses are at angles vis-a-vis vehicles at the ingress.

In operation, flipper 201 exerts a laterally-directed attractive force on a passing vehicle 13, e.g., of the type shown in FIG. 16, to initiate switching (e.g., to the second egress of a diverge). Referring also to FIGS. 16 and 18, once the switching is started, the septum 13D of the vehicle contacts and engages one side of the illustrated triangular-shaped portion 275 formed in the running surfaces 63A which supports and guides the vehicle 13 as it continues the switching action. (Although the portion is shown as triangularly-shaped in the illustrated embodiment, the shape of that extension of the running surfaces at the "vertex" 278 of the diverge can be varied according to the radius of curvature of the diverge section and the size of the septums of vehicles being switched.) Further guidance for switching can subsequently be provided by the guidance surface 63B if and as it comes into contact with corresponding surfaces 13B of the vehicle.

Further Embodiments

Further embodiments of the invention provide, individually and/or in combination, variants of mechanical flippers of the general type shown in FIG. 10; narrow-septum vehicles of the type shown in FIG. 16 or variants thereof and/or guideways of the type shown in FIGS. 15-18 and 21 or variants thereof. When used in combination, these embodiments take advantage of the narrowed cross-section of the vehicle's septum by using a smaller (and, therefore, faster) switch to to initiate vehicle switching.

Figure 22A:
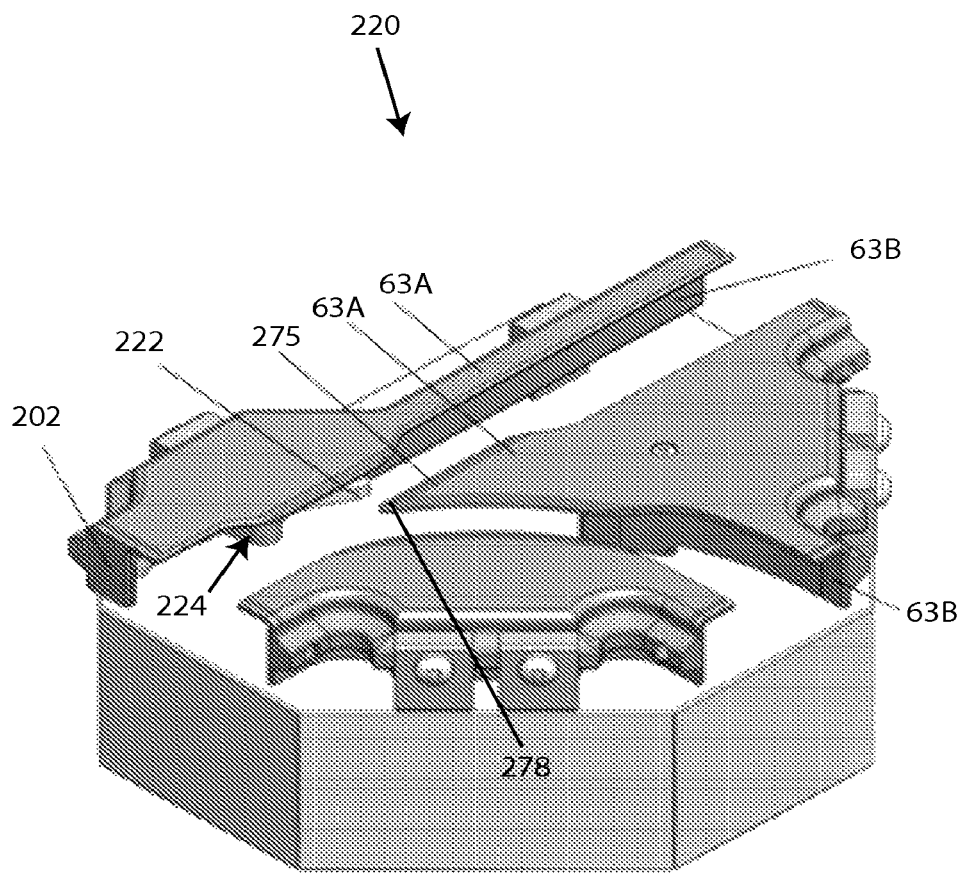
FIG. 22A is a perspective view of a diverge section of a guideway in a system according to one practice of the invention.

One such embodiment is depicted in FIG. 22A, depicting a diverge module 220 that utilizes a small flipper 222 to push a vehicle 13, e.g., of the type shown in FIG. 16, in a lateral direction to initiate switching. In the illustrated embodiment, the flipper initiates switching by pushing a surface 13B not on the septum 13 but, rather, on one of the larger cross-section regions of the vehicle body; other embodiments may vary in this regard, e.g., by pushing a surface of the septum to initiate switching. Regardless, once the switching is started, the septum of the vehicle engages one side of the extension 275 as it more fully enters into the diverge. Further guidance for switching can subsequently be provided by the guidance surface 63B if and as it comes into contact with corresponding surfaces 13B of the vehicle. The module 220 can also include a non-moveable member 202 of the type discussed above, here, a steel plate creates an attractive force that helps guide a vehicle that is not switching.

The module 220 can be utilized for switching vehicles 13 on a guideway used in small parts inspection and/or assembly operations, or otherwise, where vehicle speeds are high and/or spacing is close—thus, necessitating rapid movement of the flipper.

For small parts inspection and/or assembly, for example, such vehicles can be, by way of non-limiting example, between 50 mm (or smaller) and 200 mm (or larger) wide—i.e., where width refers to dimensions of the vehicles along an axis transverse to a direction of motion along the guideway—and have a length that is one to two (or more) times that width—where length refers to dimensions of the vehicles along an axis parallel to a direction of motion along the guideway—and, in some embodiments, again, by way of nonlimiting example, are about 60 mm square. Such vehicles can, by way of further non-limiting example, have loaded masses of between 0.2 kg (or lower) and 4 kg (or higher) and, typically, of up to about 2 kg (or higher).

Regardless, such vehicles can operate on such guideways at speeds in excess of 2 m/s. The vehicles can operate with headways of a small fraction of a second and still be switched even when adjacent vehicles move in different directions. As a general matter, a flipper 222 utilized in the aforementioned applications preferably has a mass and moment of inertia that are small as possible in order to allow rapid switching.

To this end, for small parts inspection and/or assembly, and with vehicles sized as described immediately above, a flipper 222, for example, having a mass of about 20 g-60 g and, preferably, of about 40 g (not including rotating bearings) and a length of about 5 cm—10 cm and, preferably, of about 7.5 cm—all by way of non-limiting example—can initiate switching by moving only a short distance, e.g., less than about 2 cm (or more) again, by way of non-limiting example. Of course in other embodiments, the flipper 222 can be of other masses and/or lengths and still effect similar or sufficiently rapid deployment and, therefore, switching—depending on the speed and spacing of the vehicles 13 on the guideway, the relative sizes (and geometry) of the septum, the extension, and so forth, all as will be appreciated by those skilled in the art in view of the teachings hereof.

When actuated by a rotary stepper motor 224 of the type commercially available in the art, the tip of the flipper as described can traverse that distance (and, in any event can initiate switching) in approximately 30 milliseconds, or less. This allows the module 220 to be used in applications where vehicle spacing is as short as 100 milliseconds.

Figure 22B:
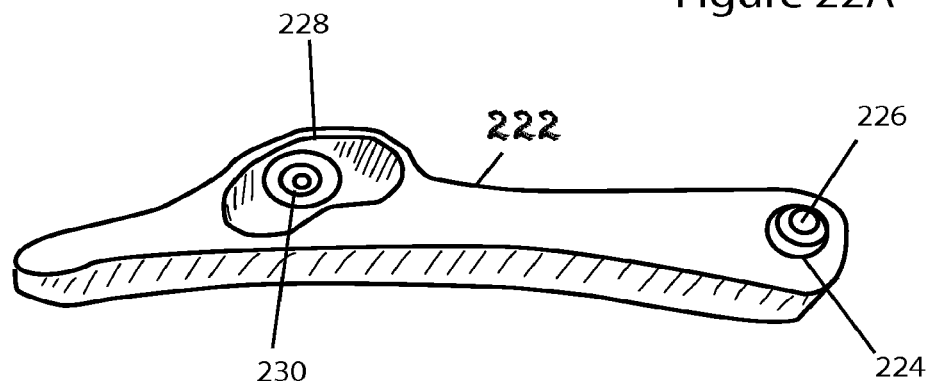
FIG. 22B is a perspective view of a flipper used in the diverge section of a system according to one practice of the invention.

Such a flipper can also be shaped, by way of example, as shown in FIG. 22B. As illustrated there, the flipper 222 includes an aperture 224 in which an axle 226 is disposed and about which flipper body pivots. The flipper further includes a kidney-shaped aperture (or cut-out) 228 that receives a motor arm 230 for positioning the flipper, e.g., in deployed, partially-deployed and fully-deployed positions. Unlike more conventional cut-outs that may be, for example, oval-shaped, the kidney-shape minimizes the motor torque required to move heavily loaded vehicles 13.

In the illustrated embodiment, the direction of motion of a vehicle at ingress of the diverge shown in FIG. 22A is substantially the same as that of a vehicle at the first (i.e., "unswitched") egress, yet the direction of motion of a vehicle at the second egress of that diverge is at an angle vis-a-vis that of a vehicle at the ingress. However, other embodiments may vary in this regard. Hence, for example, the directions of motion of vehicles at both egresses of the diverge can be at angles vis-a-vis vehicles at the ingress, hence, requiring switching in two different deployed directions (e.g., "left" and "right"). Those skilled in the art will appreciate that the teachings hereof apply as readily to such embodiments without departure from the spirit hereof and, thus, for example, that a flipper 222 of the type described above can effect switching on such embodiments, e.g., by rapid switching between to those different deployed positions (e.g., from a central "undeployed" position, or otherwise).

In some embodiments of the invention, the stepper motor 224 can include an encoder that senses and allows for precise control of the flipper position. This permits placing the flipper 222 in not just two configurations, but three or more configurations—e.g., a fully deployed configuration for diverting passing vehicles along a branch at a diverge, a partially deployed configuration for guiding passing vehicles at a merge, and a retracted configuration for allowing vehicles to continue in a current, straight-away direction of motion at a diverge. This also permits optimizing (e.g., based on trial-and-error, dynamics calculations or otherwise) flipper positions in each of these configurations (and particularly, for example, in the fully- and partially-deployed configurations) depending on vehicle speed and/or mass.

In view of the foregoing, it will be appreciated that, in embodiments of the invention that are used to switch vehicles that are tightly spaced and/or are moving rapidly, it can be helpful to size vehicle septum 13D as narrow as possible so that less flipper motion is required to effect switching. Likewise, it can be helpful to keep the mass and moment of inertia of the flipper as small as possible in order to allow rapid switching.

Figure 23A:
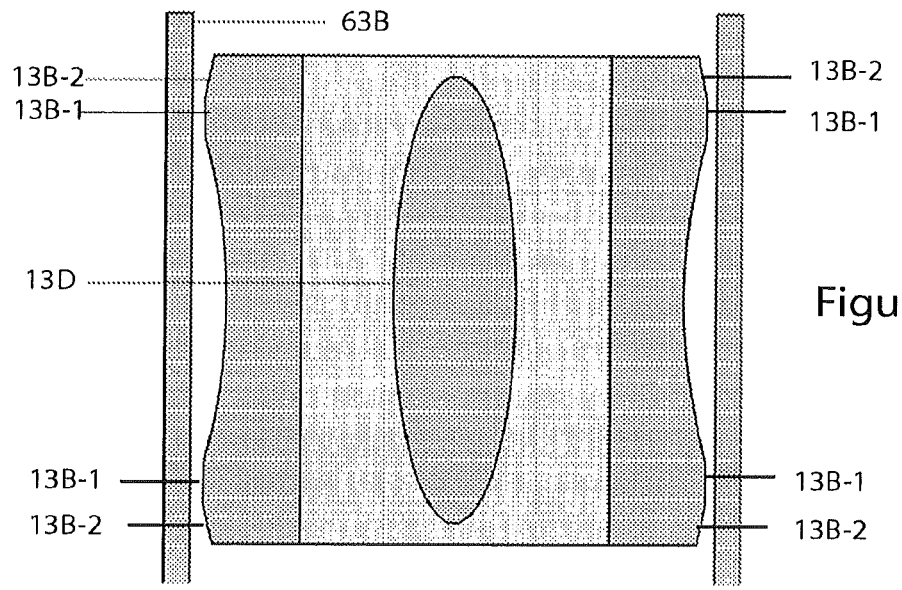
FIG. 23A depicts motion of a vehicle on a straightaway in a system according to one practice of the invention.
Figure 23B:
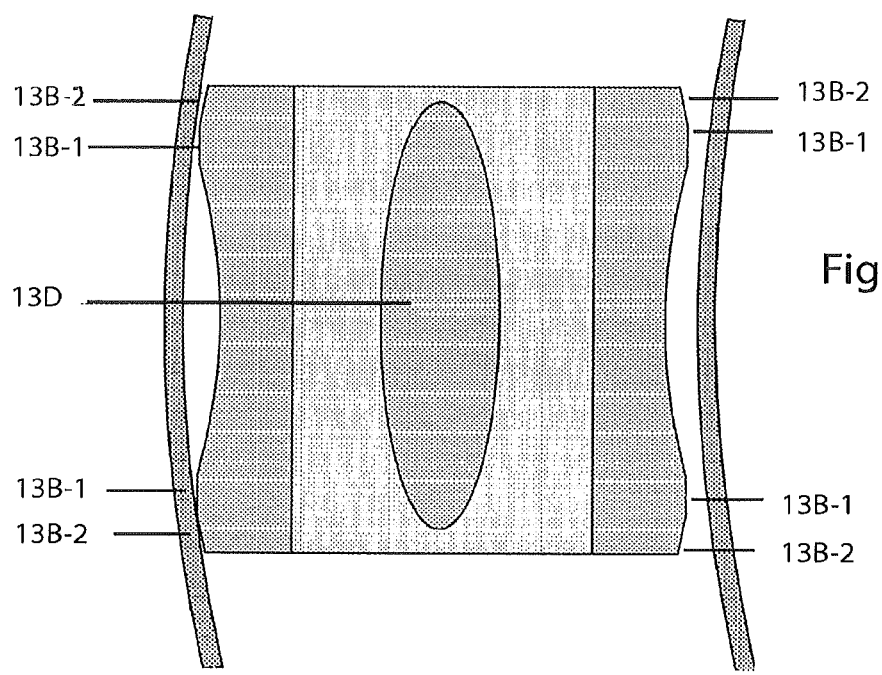
FIG. 23B depicts motion of a vehicle on a curve in a system according to one practice of the invention.

FIGS. 23A-23B are a top view of a vehicle 13 and rails in the horizontal plane defined by dashed line 160 of FIG. 16. The vehicle shown here is of the type adapted for use with switching section 220 of FIG. 22A. As shown in the drawing, the guidance surface 13B can include one or more regions, e.g., 13B-1, for contacting the surface 63B of the guideway in straight-away sections (e.g., of the diverge section or elsewhere); and regions, e.g., 13B-2, for contacting the surface 63B (alone or in combination with regions 13B-1) in curved sections of the guideway (e.g., again, of the diverge section or elsewhere). Utilization of those regions 13B-1, 13B-1—and, particularly, contact between them and guidance surfaces 63B, are illustrated in FIG. 23A (straightway) and 23B (curve).

In the illustrated embodiment, the regions 13B-1 can be characterized as peripheral regions of the surface of vehicle adjacent to contacting or potentially-contacting guidance surfaces 63B when the vehicle is disposed on a straightway Those regions may be further characterized as having tangents that are parallel to tangents of those adjacent surfaces 63B when the vehicle is so disposed. More simply put, the regions 13B-1 are those that tend to contact surfaces 63B when the vehicles traveling down a straightaway.

Conversely, in the illustrated embodiment, the regions 13B-2 can be characterized as peripheral regions of the surface of vehicle adjacent to contacting or potentially-contacting guidance surfaces 63B when the vehicle is on a curve. Those regions may be further characterized as having tangents that are parallel to tangents of those adjacent surfaces 63B when the vehicle is so disposed. More simply put, the regions 13B-2 arc those that tend to contact surfaces 63B when the vehicles traveling within a curved section of the guideway. With respect to the illustrated embodiment, those regions 13B-2 may be further characterized as curved or rounded regions of the guidance surface 13B disposed near the leading corners of the vehicle (i.e., corners that lead the vehicle as it is traveling on the guideway).

Figure 24A:
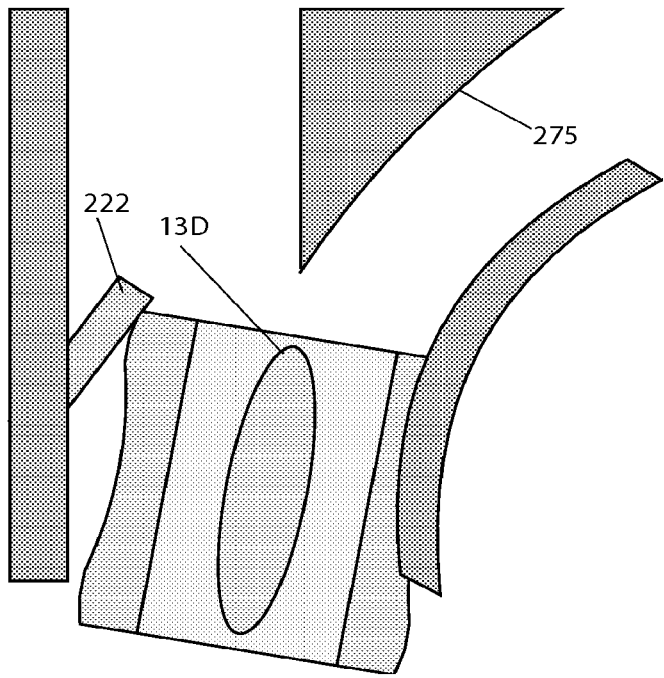
FIGS. 24A-24B depict motion of a vehicle at a diverge in a system according to one practice of the invention.
Figure 24B:
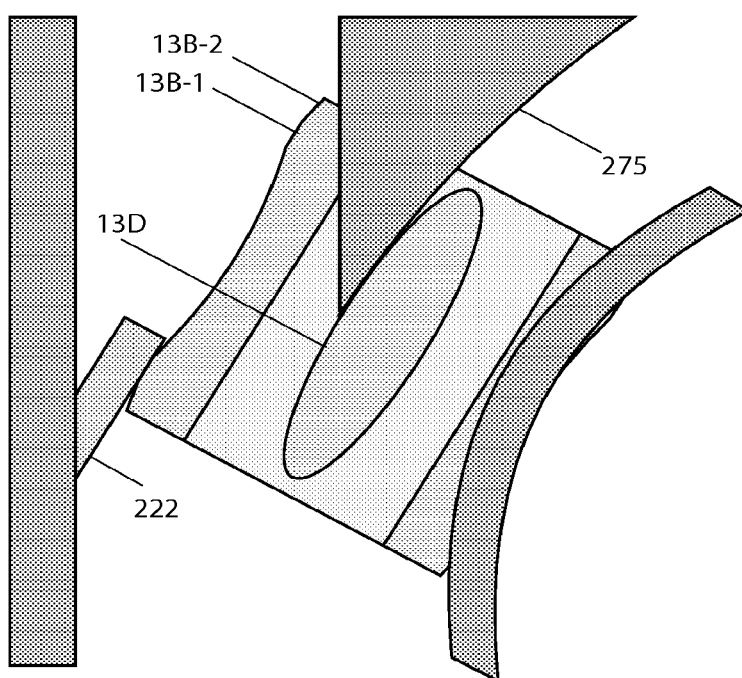

As illustrated in FIGS. 24A-24B, the regions 13B-2 (like regions 13B-1) can also play a role in switching. Referring back to the discussion of FIG. 22A, flipper 222 can push vehicle 13—and, particularly, a leading corner thereof, here, a region 13B-2—a short distance in a lateral direction in order to initiate switching. See FIG. 24A. Once the switching is started, the septum 13D of the vehicle engages one side of the extension 275 as it more fully enters into the branch of the diverge. See FIG. 24B. Further guidance for switching can subsequently be provided by the guidance surface 63B as it comes into contact with corresponding surfaces 13B-2 (and 13B-1) of the vehicle.

Modules for merging vehicles on the guideway are generally constructed and operate in the manner of the switching sections discussed above and shown, for example, in FIG. 22A, albeit with the flippers 222 on one or more of the multiple ingress pathways (as opposed to the single ingress pathway of a diverge section). Moreover, for a merge section, those flippers are only partially engaged, e.g, by a rotary stepper motor 224 or otherwise. Thus, for example, if in a given guideway, a flipper 222 of a diverge section is actuated such that its tip moves about 2 cm in order to initiate a switching operation, a flipper 22 of a merge section of that same guideway may be actuated such that its tip moves on 0.5 cm-1 cm at a merge. Such partial engagement (or "partially deployment") improves vehicle (and system) performance at a merge, e.g., by allowing for inherent variation in the lateral position of a merging vehicle while, at the same time, facilitating small adjustments in vehicle angle as it commences the merge.

Thus, in the illustrated embodiment, as a vehicle 13 enters a merge region and, particularly, as it enters a region at the ingress of a merge in which the running surfaces 63B begin to broaden, e.g., as in the case of a transitional zone between regions 1804 and 1802 in FIG. 18, the actuator 224 can partially deploy flipper 222 in order to slightly rotate the vehicle and improve its angle of entry into that zone and, more generally, into the merge. As above, in the illustrated embodiment, the flipper effects this by pushing a surface 13B not on the septum 13 but, rather, on one of the larger cross-section regions of the vehicle body and, more particularly, in some embodiments, on a region 13B-2—other embodiments may vary in this regard, e.g., by pushing elsewhere on the surface of the vehicle body such as a region 13B-1, by pushing on the surface of the septum to initiate merging, and so forth. Moreover, as in the case of a flipper of the type described in connection with FIGS. 20A, 20B, the flipper may effect such rotation magnetically and/or other than via physical contact with the vehicle.

Regardless, once the merging is commenced, the broadening or broadened running surfaces 63B of the guideway contact and/or engage the septum of the vehicle as it more fully enters into the merge, thereby, providing further guidance or channeling. Once the vehicle is on course and begins exiting the merge region (at the egress), the running surface 63B narrows.

Still further, it will be appreciated that some modules can serve roles as both diverge and merge regions, depending the direction of vehicle travel. Such modules can utilize flippers 222 as described above at each of the ingresses/egresses, each selectively activated as described above depending on whether that ingress/egress is serving as the ingress of a diverge (or switching) operation or as an ingress of a merge operation.

As evident in the drawings, in some embodiments, the bodies of some vehicles 13 can generally be of rectangular cross-section (irrespective, for example, of septums 13D, pins or other extensions 24, 31, 102, and so forth) and can, moreover, include convex sides as shown for example in FIGS. 23 and 24. Vehicles of other shapes can be used with guideways in accord herewith, as well.

Figure 25A:
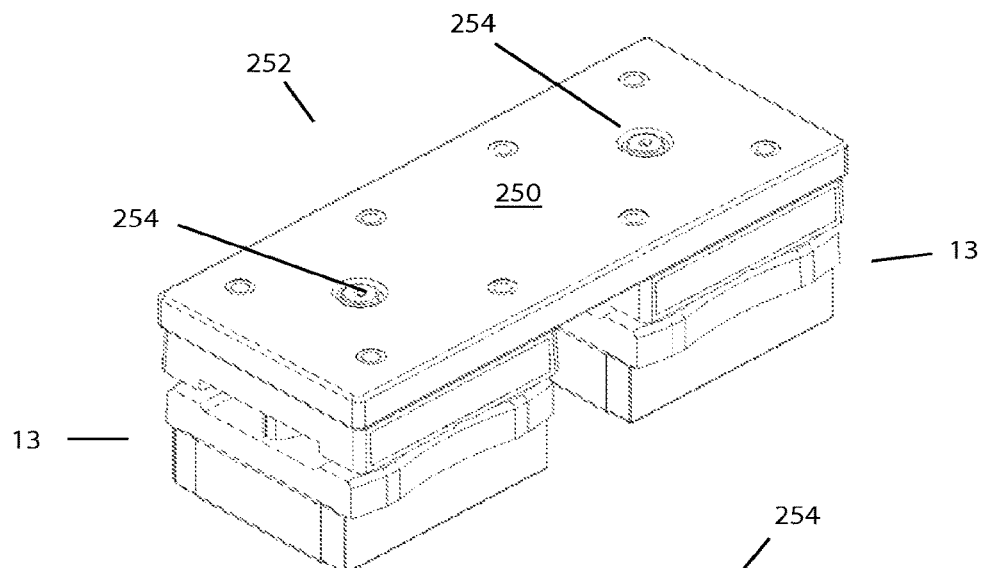
Figure 25B:
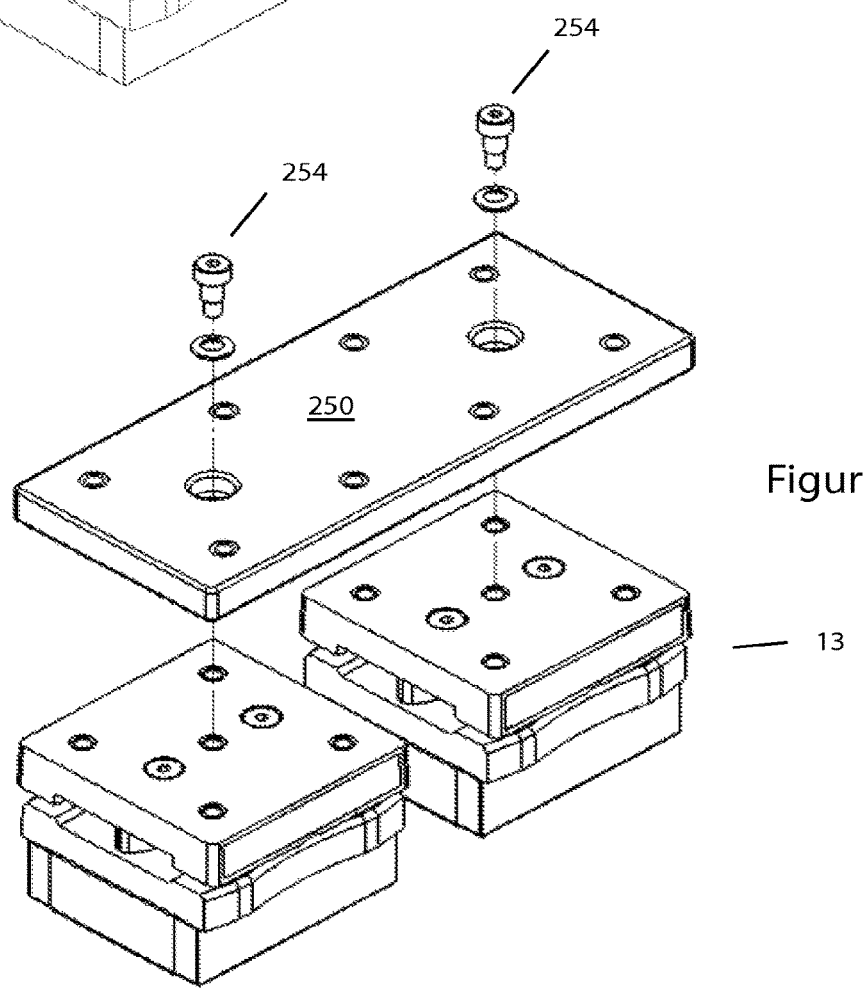

Thus, for example two (or more) vehicles 13 of the type described above and shown in FIGS. 23-24 can be joined, e.g., by a platform 250, to form a single vehicle 252 of the type shown in FIG. 25A and, in an exploded view, in FIG. 25B. To facilitate movement around curves, corners and other regions of the guideway, one or more of the constituent vehicles 13 can rotate with respect to the other and/or with respect to the platform 250. In the illustrated embodiment, this is effected by coupling the platform 250 to one or more of the constituent vehicles pivotably, e.g., via mounts 254 which may include bearings or otherwise. In other embodiments, it may be effected via use of an articulated platform 250 or otherwise. The vehicle 250 can be utilized as described above in connection with vehicles 13 discussed elsewhere herein. Advantages of vehicles as shown in FIG. 25 include, for example, that they can carry larger or more massive loads, can better navigate corners or curves, and can used in more complex guideway maneuvers that call for moving the constituent vehicles differently with respect to one another on the guideway.

Vehicles of still other shapes can be used with guideways in accord herewith, as well. A further such example is the vehicle 260 shown in FIG. 26A and, in exploded view, in FIG. 26B. Rather than being of a generally rectangular cross-section, the vehicle 260 may be generally described as having a cross-section that is a pointed oval. Apart from having a mass and relative length that may be greater than that of the other vehicles discussed herein, esp., in connection with FIGS. 1-24, the vehicle 260 can be constructed and utilized as described above in connection with vehicles 13 (and, indeed, can be pivotably coupled with other such vehicles 13, 260 in a manner paralleling that discussed in connection with FIG. 25). In accord with its larger cross-section, the vehicle 260 can incorporate larger (or a greater quantity of) permanent magnets 33, 34 in its body (and, particularly, for example, that portion below the septum and closer to the guideway coils) to facilitate moving loads. Advantages of vehicles as shown in FIG. 26 include, for example, that they can carry larger or more massive loads.

Described above are systems, apparatus and method meeting the foregoing objects, among others. It will be appreciated that the embodiments illustrated and discussed herein are merely examples of the invention and that other embodiments, incorporating changes thereto, fall within the scope of the invention. Thus, by way of non-limiting example, the invention can be practiced with embodiment in which suspension is provided by air-cushion and fluid-cushion, e.g., in addition to the wheel-less, wheeled, and other roller-based designs discussed above. By way of further non-limiting example, flippers, septums, and triangularly-shaped pieces 275 can be shaped differently than shown in the drawings and discussed above.

In view of the foregoing, what we claim is:

1. A transport system comprising:
   one or more vehicles, each vehicle having magnets disposed on both lateral sides thereof;
   a track system on which the vehicles are disposed, the track system having first regions in which propulsion coils are disposed on only one side of the vehicles, and a diverge region in which propulsion coils are disposed on both sides of the vehicles, the vehicles being, in operation, propelled to roll or slide along the track system by the propulsion coils;
   the diverge region comprising a diverge magnetic switching member that interacts with the vehicles in the diverge region to cause the vehicles to take one of two alternative paths along the track system;
   position sensors that, in operation, sense positions of the vehicles; and
   wherein movement of the vehicles along the first and diverge regions is controlled individually by control of power applied to the coils.

2. The system of claim 1, wherein the diverge magnetic switching member effects magnetic attraction with the vehicles in the vicinity of the diverge region to cause diversion of the vehicles in the diverge region.

3. The system of claim 1, wherein the diverge magnetic switching member effects magnetic repulsion with the vehicles in the vicinity of the diverge region to cause diversion of the vehicles in the diverge region.

4. The system of claim 1, wherein the diverge magnetic switching member is disposed on a lateral side of the track system in the diverge region.

5. The system of claim 1, comprising a merge region in which propulsion coils are disposed on both sides of the vehicles.

6. The system of claim 5, wherein the merge region comprises a merge magnetic switching member that interacts with the vehicles in the merge region.

7. The system of claim 6, wherein the merge magnetic switching member effects magnetic attraction with the vehicles.

8. The vehicle of claim 6 wherein the merge magnetic switching member effects magnetic repulsion with the vehicles.

9. The system of claim 1, wherein the diverge magnetic switching member comprises at non-movable member.

10. A transport system comprising:
    one or more vehicles, each vehicle having magnets disposed on both lateral sides thereof;
    a track system on which the vehicles are disposed, the track system having first regions in which propulsion coils are disposed on only one side of the vehicles, and a merge or diverge region in which propulsion coils are disposed on both sides of the vehicles, the vehicles being, in operation, propelled to roll or slide along the track system by the propulsion coils;
    the merge or diverge region comprising a non-movable switching member that interacts with the vehicles in the merge or diverge region to cause the vehicles to take a desired direction along the track system;
    position sensors that, in operation, sense positions of the vehicles; and
    wherein movement of the vehicles along the first and diverge regions is controlled individually by control of power applied to the coils.

11. The system of claim 10, wherein the non-movable switching member comprises a magnetic switching member.

12. The system of claim 11, wherein magnetic switching member effects magnetic attraction with the vehicles.

13. The system of claim 11, wherein magnetic switching member effects magnetic repulsion with the vehicles.

14. The system of claim 11, wherein the diverge magnetic switching member is disposed on a lateral side of the track system in the merge or diverge region.

15. A transport method comprising:
    disposing vehicles on a track system, each vehicle having magnets disposed on both lateral sides thereof, the track system having first regions in which propulsion coils are disposed on only one side of the vehicles, and a diverge region in which propulsion coils are disposed on both sides of the vehicles, the vehicles being, in operation, propelled to roll or slide along the track system by the propulsion coils;

activating a diverge magnetic switching member in the diverge region to interact with the vehicles in the diverge region to cause the vehicles to take one of two alternative paths along the track system;

sensing positions of the vehicles for control of the vehicles along the track system; and wherein movement of the vehicles along the first and diverge regions is controlled individually by control of power applied to the coils.

16. The method of claim 15, wherein the diverge magnetic switching member comprises a non-movable member.

17. The method of claim 15, wherein the diverge magnetic switching member is disposed on a lateral side of the track system in the merge or diverge region.

18. The method of claim 15, wherein the diverge magnetic switching member effects magnetic attraction with the vehicles in the vicinity of the diverge region to cause diversion of the vehicles in the diverge region.

19. The method of claim 15, wherein the diverge magnetic switching member effects magnetic repulsion with the vehicles in the vicinity of the diverge region to cause diversion of the vehicles in the diverge region.

20. The method of claim 15, comprising providing continuous propulsion through the diverge region via the propulsion coils disposed in the diverge region.

* * * * *